United States Patent [19]

Tozawa et al.

[11] Patent Number: 5,038,270

[45] Date of Patent: Aug. 6, 1991

[54] METHOD FOR CONTROLLING REACTOR SYSTEM

[75] Inventors: Yoichi Tozawa, Kurashiki; Shunichi Kawasaki, Yokohama; Hitoshi Matsuo, Kurashiki; Morimasa Ogawa; Genichi Emoto, both of Kurashiki, all of Japan

[73] Assignee: Mitsubishi Kasei Corporation, Tokyo, Japan

[21] Appl. No.: 342,327

[22] Filed: Apr. 24, 1989

[30] Foreign Application Priority Data

Apr. 26, 1988 [JP] Japan .................. 63-102980
Apr. 27, 1988 [JP] Japan .................. 63-105089
May 7, 1988 [JP] Japan .................. 63-110722

[51] Int. Cl.$^5$ ............................................. G05B 13/02
[52] U.S. Cl. ...................................... 364/148; 364/152; 364/503
[58] Field of Search ............................. 364/148–156, 364/492, 494, 500, 501, 503; 422/3; 202/215; 60/660

[56] References Cited

U.S. PATENT DOCUMENTS

| | | | |
|---|---|---|---|
| 3,891,836 | 6/1975 | Lee ............................. | 364/151 |
| 3,937,747 | 2/1976 | Thornton et al. .............. | 364/500 |
| 4,228,509 | 10/1980 | Kennedy ..................... | 364/501 |
| 4,349,869 | 9/1982 | Prett et al. .................. | 364/159 |
| 4,612,621 | 9/1986 | Kaya et al. .................. | 364/148 |
| 4,736,316 | 4/1988 | Wallman ..................... | 364/153 |

Primary Examiner—Jerry Smith
Assistant Examiner—Paul Gordon
Attorney, Agent, or Firm—Oblon, Spivak, McClelland, Maier & Neustadt

[57] ABSTRACT

The present invention relates to a method for controlling a reactor system comprising a plurality of reactors for a thermal decomposition reaction. Based on the operational control limits of each reactor in the system, a preliminary load allowance function is obtained, and during operation of the system, control factor data for each reactor is fed into a computer to calculate a load allowance for each reactor. Based on the total amount of conversion reactor product and the respective load allowances of each reactor, a system load change is distributed to each reactor, resulting in respective reactor load changes. This data is fed back into the operational control factors for each reactor, resulting in adjustment of the output of each reactor. Operational control factors for each reactor include product output, product composition, reactor temperature, reactor efficiency, and physical properties of the starting material. The present method provides a means for controlling the output of a series of parallel thermal decomposition reactors, such that a desired rate and composition of thermal decomposition product is obtained from any of a number of starting materials supplied to the reactor system.

19 Claims, 13 Drawing Sheets

METHOD FOR CONTROLLING REACTOR SYSTEM

BACKGROUND OF THE INVENTION

1. Field of the Invention

The present invention relates to a method for controlling a reactor system. More particularly, the present invention relates to a method for controlling a reactor system comprising a plurality of reactors such as furnaces for thermal decomposition of a hydrocarbon such as naphtha or furnaces for thermal decomposition of a chlorinated hydrocarbon such as 1,2-dichloroethane, for efficient operation of such reactor system.

2. Discussion of Background

In a chemical plant of a type wherein a conversion reaction is conducted by a reactor system comprising a plurality of reactors, it is common to sequentially and periodically stop the operation of the reactors for tuning up, while maintaining the overall size of production of the required product of the entire system at a constant level. Chemical plants of this type include, for example, a plant for thermal decomposition of a hydrocarbon and a plant for thermal decomposition of a chlorinated hydrocarbon. The conventional operation will be described mainly with respect to the plant for thermal decomposition of a hydrocarbon.

A process for producing an olefinic hydrocarbon such as ethylene or propylene by thermal decomposition (steam cracking) of a gaseous hydrocarbon such as ethane, propane or butane, or a liquid hydrocarbon such as naphtha, gas oil, kerosine, light oil or heavy oil, in the presence of steam, is well-known. In such thermal decomposition, formation of carbonaceous substance (coking) takes place in the decomposition tubes of the thermal decomposition furnace, and the carbonaceous substance deposits on the inner walls of the tubes. Therefore, it is common to periodically stop the operation of the decomposition furnace for decoking. An industrial plant for the production of an olefin usually comprises a plurality of decomposition furnaces, e.g. 10 or more furnaces, and it is common to conduct decoking treatment of the respective decomposition furnaces sequentially and periodically, while maintaining the size of production of the olefin of the entire plant at a constant level. In such a case, the operator distributes, based on his experience, the work load corresponding to the size of olefin production of the decomposition furnace under decoking treatment to other furnaces in operation taking into consideration the existing operational conditions of the respective furnaces with due care not to create overloading for the operation of the respective furnaces and accordingly changes the operational conditions (such as the supply of the hydrocarbon starting material or the temperature for thermal decomposition).

However, by such a method wherein the work load for the olefin production is distributed to the respective reactors on the basis of the experience of an operator, the state of deterioration of the respective reactors can not adequately be grasped, and the allowance or tolerance to the operational limits of the respective reactors can not finely and accurately be determined, whereby there have been problems such that an undue load is likely to be exerted to a reactor having no substantial allowance, the cycle for tuning up the reactors, such as decoking of decomposition furnaces, is obliged to be short, and the state of deterioration varies among the reactors.

SUMMARY OF THE INVENTION

Under the above described circumstances of the conventional techniques, the present inventors have conducted extensive researches for a method of accurately grasping the state of deterioration of each reactor and operating the respective reactors under a proper distribution of the load and have finally accomplished the present invention.

Namely, it is an object of the present invention to provide a method for efficiently operating a reactor system comprising a plurality of reactors under a proper distribution of the load to the respective reactors by accurately grasping the state of deterioration of each reactor.

Another object of the present invention is to provide a method for efficiently operating a thermal decomposition furnace system comprising a plurality of thermal decomposition furnaces such as furnaces for thermal decomposition of a hydrocarbon or furnaces for thermal decomposition of a chlorinated hydrocarbon, under a proper distribution of the load to the respective thermal decomposition furnaces by accurately grasping the state of deterioration of each thermal decomposition furnace.

In the broadest sense, the present invention provides a method for controlling a reactor system comprising a plurality of reactors for a conversion reaction, the operation of each of said reactors being controlled under predetermined or set values of selected control factors, which comprises:

(A-1) preliminarily obtaining a function (hereinafter referred to as a "load allowance function") representing the operational condition of each reactor in operation in terms of the degree of proximity, to the predetermined control limits, of variables representing the control factors for controlling the operation of each reactor; and (A-2) during the operation of the reactor system, repeating:

(1)(a) for each reactor, inputting (or gathering) data of the control factors to a computer to calculate a value (hereinafter referred to as a "load allowance") of the load allowance function, and (b) distributing a required change (hereinafter referred to as a "system load change") in the size of production of the conversion reaction product of the reactor system to the reactors depending upon their respective load allowances to obtain a load change (hereinafter referred to as a "reactor load change") of each reactor; and (2) changing the predetermined values of control factors of each reactor to give a size of production (hereinafter referred to as a "required size of production") of the conversion reaction product corresponding to the reactor load change.

DETAILED DESCRIPTION OF THE INVENTION

The method of the present invention is applicable to a controlling method of reactors in a reactor system comprising a plurality of reactors useful for various conversion reactions, so that the respective reactors are operated under proper conditions. Specifically, the method of the present invention is advantageously applicable to a controlling method of decomposition furnaces in a thermal decomposition (or cracking) furnace system comprising a plurality of thermal decomposition furnaces useful for the production of an olefin by the thermal decomposition of a hydrocarbon such as naphtha or for the production of a vinyl chloride monomer by the thermal decomposition of a chlorinated hydrocarbon such as 1,2-dichloroethane, so that the respective thermal decomposition furnaces are operated under proper conditions.

Now, the present invention will be described in further detail with reference to the drawings illustrating the controlling method of furnaces for thermal decomposition of a hydrocarbon.

In the thermal decomposition of a hydrocarbon on an industrial scale, a hydrocarbon which is gaseous at room temperature, such as ethane, propane or butane, or a hydrocarbon which is liquid at room temperature such as naphtha, gas oil, kerosine, light oil or heavy oil, is usually used as the hydrocarbon starting material. These hydrocarbon materials may be used alone (single decomposition) or the liquid hydrocarbon and the gaseous hydrocarbon may be used in combination (combined decomposition).

Figure 2:
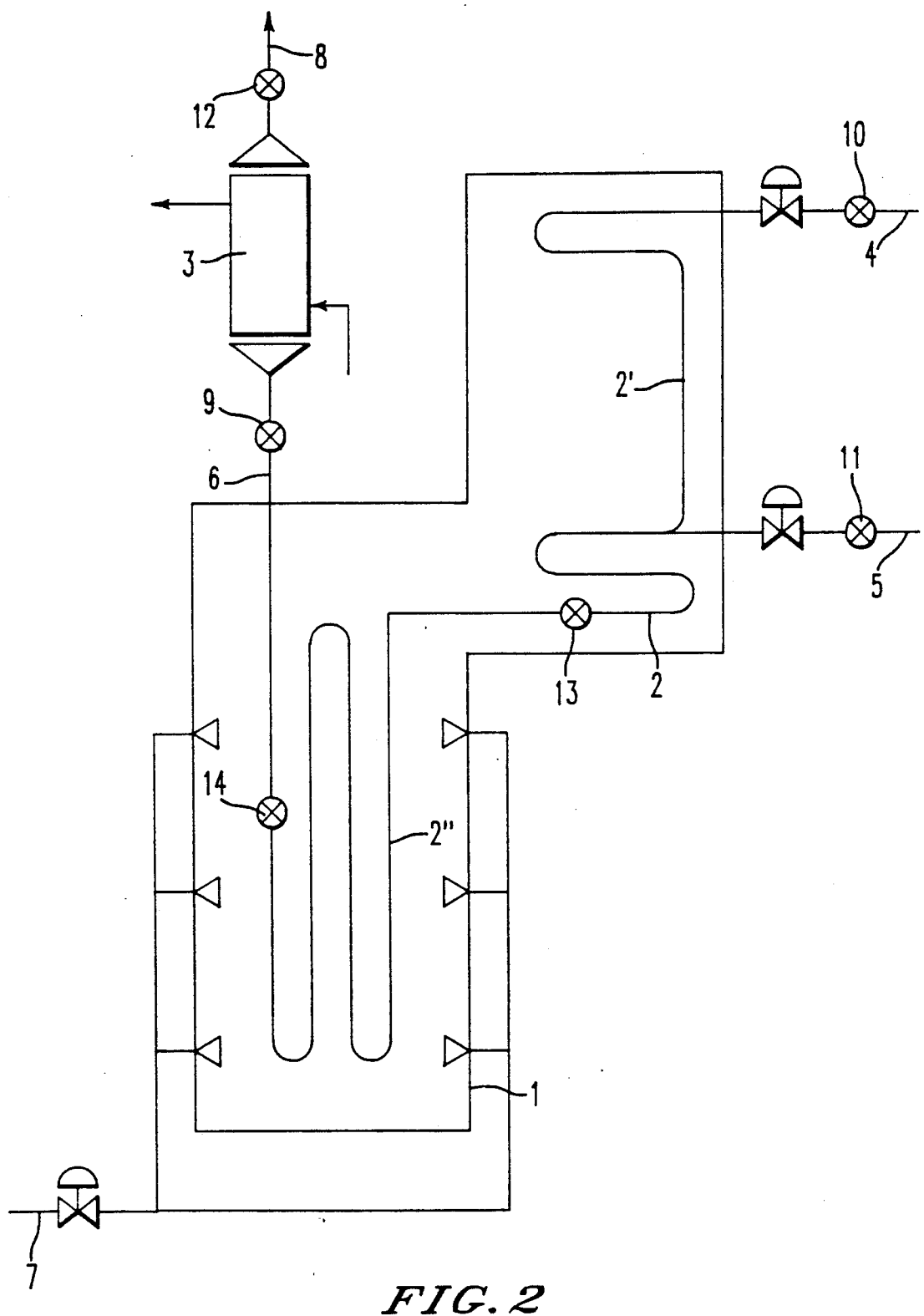
FIG. 2 is a diagrammatical view illustrating an embodiment of a thermal decomposition furnace to which the method of the present invention is applied.

FIG. 2 is a diagrammatical view illustrating an embodiment of a thermal decomposition furnace to which the method of the present invention is applied. In the Figure, reference numeral 1 indicates the main body of the thermal decomposition furnace, numeral 2 is a heating tube, numeral 3 is a heat exchanger for rapid cooling, and numeral 7 is a fuel supply tube. The heating tube 2 is disposed inside the main body 1 of the thermal decomposition furnace, but from the functional point of view, it is divided into a preheating section 2' and a thermal decomposition section 2''. To one end of the heating tube 2, a hydrocarbon starting material supply tube 4 is connected for introducing a hydrocarbon starting material such as naphtha, and at the other end, an outlet pipe 6 is connected for introducing the thermal decomposition product to the heat exchanger 3 for rapid cooling. Further, at an intermediate position of the preheating section, a steam supply tube 5 is connected for introducing steam. A liquid-hydrocarbon starting material such as naphtha is supplied from the supply tube 4 usually at a temperature of from 100° to 130° C. under a pressure of from 2.5 to 6.0 kg cm$^2$G and heated during the passage through the preheating section 2' of the heating tube usually to a temperature of from 450° to 650° C., whereby the entire amount is vaporized. The thermal decomposition at the thermal decomposition section 2'' may be conducted, for example, under such a condition that the decomposition temperature is from 650° to 850° C. and the steam ratio (weight ratio of steam/hydrocarbon starting material) is within a range of from 0.4 to 1.0. The decomposed gas formed by the thermal decomposition reaction is withdrawn at the terminal end of the heating tube 2 usually at a temperature of from 750° to 850° C. under a pressure of from 0.7 to 1.2 kg cm$^2$G, passes through the outlet pipe 6 and enters the heat exchanger 3 for rapid cooling. In the heat exchanger, it is cooled usually to a temperature of from 350° to 500° C. and then introduced through a discharge tube 8 to a separation purification system.

Figure 1:
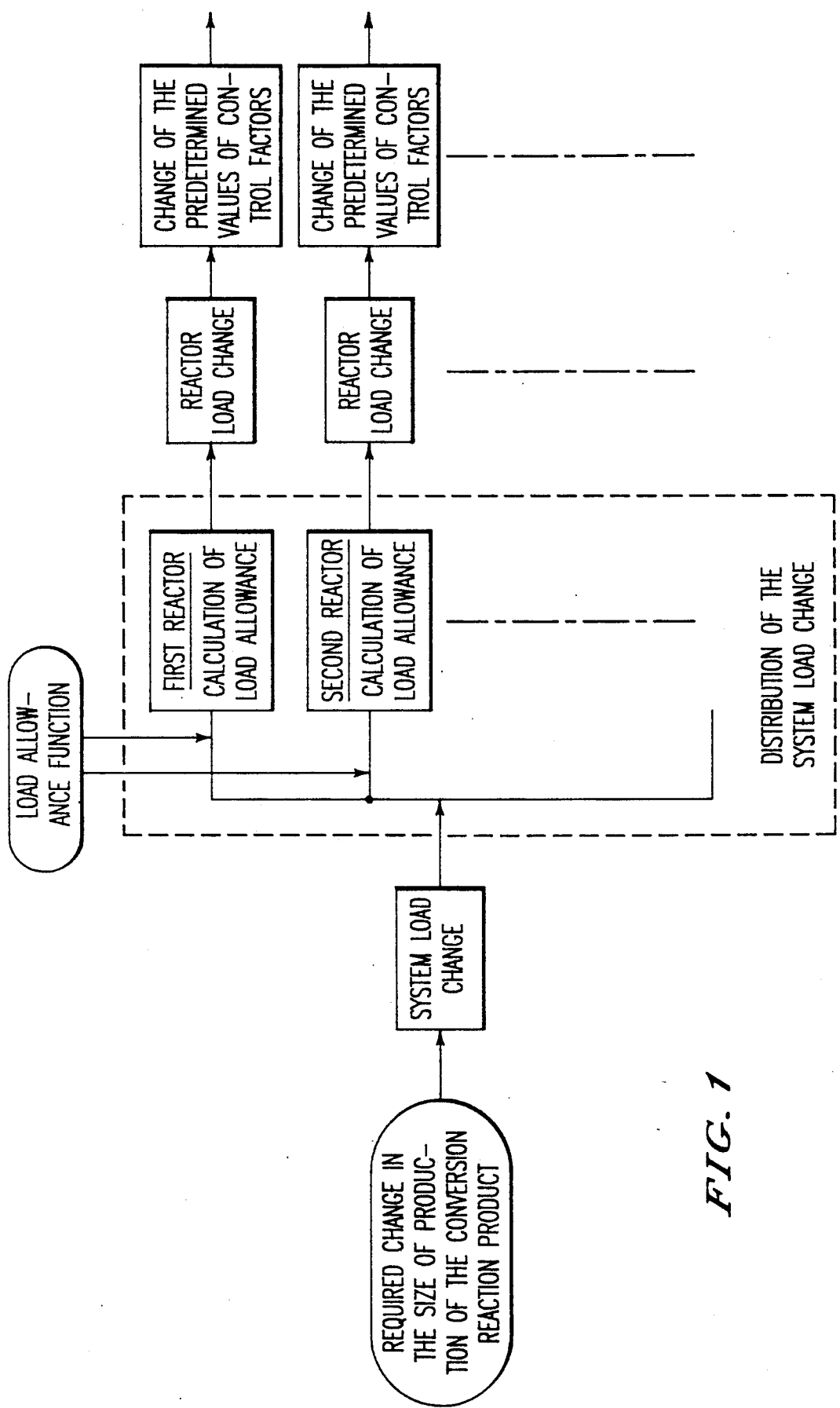
FIG. 1 is a block diagram showing the control of a reactor system by the controlling method of the present invention using a load allowance function.

According to the present invention, when a conversion reaction is conducted in a reactor system comprising a plurality of reactors, e.g. when an olefin is produced by thermally decomposing a hydrocarbon starting material in the presence of steam in a thermal decomposition furnace system comprising a plurality of thermal decomposition furaces, usually at least ten furnaces, as shown in FIG. 2, whereby the operation of each of said reactors is controlled under predetermined values of selected control factors, the above-mentioned load allowance function is preliminarily obtained, and during the operation of the reactor system, the reactor system is controlled by a series of operations as identified above in (A-2)(1)-(2) at short time intervals. FIG. 1 diagrammatically illustrates the controlling method of the present invention.

Now, the method of the present invention will be described in detail with reference to the embodiment for the thermal decomposition of a hydrocarbon.

Determination of the load allowance function

Heretofore, in the thermal decomposition of a hydrocarbon, it has been common that the operator judges the operational condition of each thermal decomposition furnace based on (a) the outlet temperature of the thermal decomposition furnace, (b) the feeding rate of the hydrocarbon starting material, (c) the steam supply rate, (d) the outlet temperature of the heat exchanger for rapid cooling, (e) the temperature of the convection section, (f) the surface temperature of the decomposition tube, etc., and if any one of the measured values thereof is close to the predetermined upper or lower limit, the operational condition is adjusted not to increase, or to reduce the load to the furnace.

According to the method of the present invention, the operational condition of each reactor which used to be evaluated by a subjective judgement by an operator, is grasped in the form of a function whereby the operational condition is represented in terms of the degree of proximity, to the predetermined control limits, of variables representing the control factors such as the above (a) to (f) for controlling the operation of each reactor. The control limits are determined based on the physical restrictions of each reactor and on the operational experience to the limits of the operational conditions where the operation can safely and reasonably be conducted, and they are usually determined with respect to the individual control factors as mentioned above, but in some cases, they may be determined with respect to a combination (such as a sum or product) of two or more control factors. The above function which represents the operational condition of each reactor in terms of the degree of proximity to such control limits, may be regarded as representing the degree of how much load can still be exerted to each reactor. Therefore, this function is referred to in this specification as a "load allowance function".

There is no particular restriction as to the form of the load allowance function, so long as it properly represents the degree of proximity of the operational condition of each reactor, to the control limits. Usually, this purpose is adequately attained by setting up a function wherein deviations from the respective control limits of the measured values obtained from the plant with respect to each of a proper number of selected control factors (or functions of such deviations) are used as variables. As such a function, it is possible to employ, for example, a product or sum of the above-mentioned deviations (or functions thereof), or a combination thereof. It is of course necessary to adjust the actual manner of operation of the controlling method according to the method of the present invention depending upon the form of the load allowance function used.

As described above, the load allowance function may be set up by various methods. Now, an embodiment of the thermal decomposition of a hydrocarbon will be described wherein a fuzzy model (a model based on a fuzzy theory in mathematics) is used as an example of a method of setting up a function using as variables functions of deviations from the control limits of the measured values of control factors.

The following may be mentioned as the control factors used as variables for controlling the operation of the thermal decomposition furnace:

| Control factors | Symbols |
|---|---|
| Outlet temperature of thermal decomposition furnace | $x_1$ |
| Feeding rate of hydrocarbon starting material or opening degree of hydrocarbon starting material supply valve | $x_2$ |
| Steam supply rate or opening degree of steam supply valve | $x_3$ |
| Outlet temperature of heat exchanger for rapid cooling | $x_4$ |
| Temperature of convection section | $x_5$ |
| Surface temperature of decomposition tube | $x_6$ |
| Number of days in operation | $x_7$ |

With respect to the control factors $x_1$ to $x_6$, the values of such control factors can be measured, for example, by a device 9 for measuring the outlet temperature of the thermal decomposition furnace, a device 10 for measuring the feeding rate of the hydrocarbon starting material or the opening degree of the hydrocarbon starting material supply valve, a device 11 for measuring the steam supply rate or the opening degree of the steam supply valve, a device 12 for measuring the outlet temperature of the heat exchanger for rapid cooling, a device 13 for measuring the temperature of the convection section, and a device 14 for measuring the surface temperature of the decomposition tube as shown in FIG. 2.

With respect to each of the above-mentioned variables, a function reflecting its degree of proximity to the predetermined control limit, is defined. Each of the function thus obtained is hereinafter referred to as a "membership function". The values represented by the respective membership functions are composed in the following manner to obtain a load allowance function.

$$\text{Load allowance} = f[g_1(x_1), g_2(x_2), g_3(x_3), g_4(x_4), g_5(x_5), g_6(x_6), g_7(x_7)]$$

where $g_i$:
membership function (i=1-7)
f: load allowance function

To increase the precision of the load allowance function, it is usually preferred to employ as many variables (contol factors) as possible, hence as many membership functions as possible. However, the number of membership functions may be reduced based on the comparison of the simplification of the measuring and computer control and the precision of the control. From such a viewpoint, for example, $x_1$, $x_2$ and $x_3$ may be used as the sole control factors. In such a case, the load allowance will be represented as follows:

$$\text{Load allowance} = f[g_1(x_1), g_2(x_2), g_3(x_3)]$$

where
$g_i$: membership function (i=1-3)
f: load allowance function

The form of the load allowance function f is usually affected by the operational directions of the control factors and should preferably be set up for each direction.

There is no particular restriction as to the selection of the control factors used for the change of the operational condition. It is usually possible to carry out the necessary change of the operational condition by two control factors of the outlet temperature of the thermal decomposition furnace and the feeding rate of the hydrocarbon starting material. In such a case, the operational directions of these control factors may be classified into the following patterns (I) to (IV).

| | |
|---|---|
| (I) Outlet temperature of thermal decomposition furnace: | Raise |
| Feeding rate of hydrocarbon starting material: | Increase |
| (II) Outlet temperature of thermal decomposition furnace: | Lower |
| Feeding rate of hydrocarbon starting material: | Decrease |
| (III) Outlet temperature of thermal decomposition furnace: | Raise |
| Feeding rate of hydrocarbon starting material: | Decrease |
| (IV) Outlet temperature of thermal decomposition furnace: | Lower |
| Feeding rate of hydrocarbon starting material: | Increase |

In general, when the temperature of the thermal decomposition furnace is raised, olefins having shorter carbon chains are likely to form, and when the feeding rate of the hydrocarbon starting material is increased, the production of olefins increases as a whole.

Accordingly, depending upon the required change such as a required change in the size of production of the olefin of the thermal decomposition furnace system i.e. the change (increase or decrease) of the olefin production itself, or a change in the composition of the formed olefin (such as a change to increase the proportion of ethylene formation), the operational directions for the outlet temperature of the thermal decomposition furnace and the feeding rate of the hydrocarbon starting material, are selected from the above mentioned patterns (I) to (IV), and the corresponding load allowance function is usually selected.

The operational directions of the control factors of each thermal decomposition furnace, may be selected depending upon the circumstances of each thermal decomposition furnace, and it is unnecessary to adopt the same pattern for the entire system. However, in many cases, it is simplest and most reasonable for the operation of a thermal decomposition furnace system to distribute the change in the size of olefin production of the entire thermal decomposition furnace system to as many thermal decomposition furnaces as possible. Therefore, it is usually preferred to adopt the same pattern for the entire system.

Now, the setting up of load allowance functions will be described more concretely as to each of the above-mentioned patterns (I) to (IV).

Pattern (I)

With respect to variables $x_1$ to $x_6$, the membership function is defined as follows:

$$g_i = 1 (x_i < H2(i))$$

$$g_i = \frac{H1(i) - x_i}{H1(i) - H2(i)} \quad (H2(i) \leq x_i \leq H1(i))$$

$$g_i \in [0, 1], (i = 1-6)$$

where H1(i) is the upper limit i.e. the limit for safe and reasonable operation determined from the physical restrictions of the decomposition furnace and from experience of the operation, and H2(i) is a usual operational limit which is a point where no further increase of the load is desirable since such a variable has come close to the above-mentioned upper limit. (For example, the usual operational limit is selected within a range of at least 0.8 H1(i) and less than H1(i)).

The larger the value of $g_i$, the larger the allowance.

With respect to $x_7$ i.e. the number of days in operation, the effect of the number of days in operation to the operational condition is different from other variables, and it may be defined, for example, as follows:

$$g_7 = 1 + \alpha \ (0 \leq x_7 < \tfrac{1}{3}D) \ \text{[Initial stage of operation]}$$

$$g_7 = 1.0 \ (\tfrac{1}{3}D \leq x_7 < \tfrac{2}{3}D)$$

$$g_7 = 1 - \alpha \ (\tfrac{2}{3}D \leq x_7 \leq D) \ \text{[Final stage of operation]}$$

$$\alpha \in [0, 0.05],$$

D: Upper limit for the number of days in operation

The composition of the foregoing membership functions, i.e. load allowance function, is defined as follows:

$$f(g_1, g_2, g_3, g_4, g_5, g_6, g_7) = g_1 \cdot g_2 \cdot g_3 \cdot g_7 \cdot MIN(g_4, g_5, g_6)$$

where MIN ($g_4$, $g_5$, $g_6$) means the minimum value among $g_4$, $g_5$ and $g_6$.

Pattern (II)

With respect to variables $x_1$ and $x_2$, the membership function may be defined as follows:

$$g_i = 1 (x_i > L2(i))$$

$$g_i = \frac{x_i - L1(i)}{L2(i) - L1(i)} \quad (L1(i) \leq x_i \leq L2(i))$$

$$g_i \in [0, 1], (i = 1-2)$$

where L1(i) is the operational lower limit i.e. the lower limit for safe and reasonable operation of the decomposition furnace, and L2(i) is a usual operational limit which is a point where no further decrease is desirable since the variable is close to the lower limit.

With respect to $x_3$ to $x_6$, there is no particular lower limit. Therefore, when such variables are closer to the upper limits, the load will be lowered in a larger extent. The membership function may be defined as follows:

$$g_i = 1(x_i < H2(i))$$

$$g_i = \frac{x_i - H2(i)}{H1(i) - H2(i)} + 1 (H2(i) \leq x_i \leq H1(i))$$

$$g_i \in [1, 2], (i = 3-6)$$

With respect to $x_7$ i.e. the number of days in operation, the load will be lowered in a larger extent in a case where the number of days in operation is larger. The membership function is defined as follows:

$$g_7 = 1 - \alpha \quad (0 \leq x_7 < \tfrac{1}{3}D)$$

$$g_7 = 1.0 \quad (\tfrac{1}{3}D \leq x_7 \tfrac{2}{3}D)$$

$$g_7 = 1 + \alpha \quad (\tfrac{2}{3}D \leq x_7 \leq D)$$

$$\alpha \epsilon [0, 0.05],$$

D: Upper limit for the number of days in operation

The composition of the foregoing membership functions is defined as follows:

$$f(g_1, g_2, g_3, g_4, g_5, g_6, g_7) = g_1 \cdot g_2 \cdot g_3 \cdot g_7 \cdot MAX(g_4, g_5, g_6)$$

where MAX ($g_4$, $g_5$, $g_6$) means the maximum value among $g_4$, $g_5$ and $g_6$.

Pattern (III)

With respect to variable $x_1$, the membership function is defined as follows in the same manner as pattern (I) paying attention to the operational upper limit:

$$g_i = 1 (x_i < H2(i))$$

$$g_i = \frac{H1(i) - x_i}{H1(i) - H2(i)} \quad (H2(i) \leq x_i \leq H1(i))$$

$$g_i \epsilon [0, 1], (i = 1)$$

With respect to $x_2$, the membership function is defined as follows in the same manner as in pattern (II) paying attention to the operational lower limit:

$$g_i = 1 (x_i > L2(i))$$

$$g_i = \frac{x_i - L1(i)}{L2(i) - L1(i)} \quad (L1(i) \leq x_i \leq L2(i))$$

$$g_i \epsilon [0, 1], (i = 2)$$

With respect to $x_3$ to $x_7$, membership functions are the same as in the case of pattern (I).

The composition of the membership functions is also the same as in the case of the pattern (I).

$$f(g_1, g_2, g_3, g_4, g_5, g_6, g_7) = g_1 \cdot g_2 \cdot g_3 \cdot g_7 \cdot MIN(g_4, g_5, g_6)$$

Pattern (IV)

With respect to variable $x_1$, the membership function is defined as follows in the same manner as in the case of pattern (II) paying attention to the operational lower limit:

$$g_i = 1 (x_i > L2(i))$$

$$g_i = \frac{x_i - L1(i)}{L2(i) - L1(i)} \quad (L1(i) \leq x_i \leq L2(i))$$

$$g_i \epsilon [0, 1], (i = 1)$$

With respect to $x_2$, the membership function is defined as follows in the same manner as in the case of pattern (I) paying attention to the operational upper limit:

$$g_i = 1 (x_i < H2(i))$$

$$g_i = \frac{H1(i) - x_i}{H1(i) - H2(i)} \quad (H2(i) \leq x_i \leq H1(i))$$

$$g_i \epsilon [0, 1], (i = 2)$$

With respect to $x_3$ to $x_7$, the membership functions are the same as in the case of pattern (I).

The composition of the membership functions is also the same as in the case of pattern (I):

$$f(g_1, g_2, g_3, g_4, g_5, g_6, g_7) = g_1 \cdot g_2 \cdot g_3 \cdot g_7 \cdot MIN(g_4, g_5, g_6)$$

According to the method of the present invention, the reactor system is controlled by a series of operations as will be described in the following (1) and (2) by using the load allowance function as mentioned above.

Namely, as shown in FIG. 1, for the operation of a reactor system, a change in the size of production of the conversion reaction product will be required for various reasons, for example, in order to bring it closer to the required size of production of the conversion reaction product or to change the required size itself of production of the conversion reaction product. Depending upon such a requirement, the required change (the system load change) in the size of production of the conversion reaction product is distributed to the reactors in such a manner that (1)(a) the load allowances of the respective reactors are calculated by the load allowance functions, and (1)(b) the distribution of the system load change to the respective reactors (the reactor load change) is determined depending upon the respective load allowances, and (2) the predetermined values for the control factors of each reactor are changed to give the size of production (the required size of production) of the conversion reaction product corresponding to the reactor load change. This series of operations is repeated for continuous operation.

(1)(a) Calculation of load allowance

For each reactor, measured data of control factors (variables) for controlling the operation of the reactor, are given to the above-mentioned load allowance function to calculate the load allowance i.e. the value of the load allowance function.

(1)(b) Distribution of system load change

Depending upon the load allowances of the respective reactors thus obtained, the system load change i.e. the required change in the size of production of the conversion reaction product of the reactor system, is distributed to the respective reactors to obtain a load change in each reactor (reactor load change). The distribution is preferably in accordance with the following equation.

$$\begin{pmatrix} \text{Reactor load} \\ \text{change} \end{pmatrix} = \begin{pmatrix} \text{System load} \\ \text{change} \end{pmatrix} \times \frac{\begin{pmatrix} \text{Load allowance} \\ \text{of each reactor} \end{pmatrix}}{\Sigma \begin{pmatrix} \text{Load allowance} \\ \text{of each reactor} \end{pmatrix}}$$

However, when the precision of the load allowance function is inadequate, and the operational condition of a certain reactor is reflected too much or too little, a suitable coefficient may be introduced for correction based on experience to the above equation.

(2) Changing the operational condition of each reactor

The predetermined values of control factors of each reactor are changed to give the size of production of the conversion reaction prouduct corresponding to the reactor load change calculated in the above (1)(b) (the required size of production of the conversion reaction product), and the operation of the reactor system is continued.

There is no particular restriction as to the manner of changing the predetermined values of control factors of each reactor. For example, the relation between the predetermined values and the size of production of the conversion reaction product is determined from the past experience of operation, and the change is conducted in accordance with the relation.

For example, in the case of the thermal decomposition of a hydrocarbon, there is a general tendency such that as the temperature of the thermal decomposition furnace ($x_1$) rises, olefins having shorter carbon chains are likely to form, and as the feeding rate of the hydrocarbon starting material ($x_2$) increases, the olefin production increases as a whole. This tendency is quantitatively analyzed, and the relation between the required size of olefin production and the predetermined values of control factors of the corresponding thermal decomposition furnace, is tabled, and the values of control factors of each thermal decomposition furnace can be thereby changed. Otherwise, such relation between the values of control factors and the size of olefin production is preliminarily represented by a function on the basis of experimental data, and by using this function, the values of control factors can be calculated from the required size of olefin production. Thus, according to the method of the present invention, for the operation of a thermal decomposition furnace system, the operational condition can be changed simply, properly and efficiently to give a proper load to each thermal decomposition furnace by conducting from time to time the control by inputting data of the control factors of each thermal decomposition furnace to a computer, followed by a series of operations as described in the above (1) and (2) to change the operational condition of each thermal decomposition furnace. By conducting the control according to the method of the present invention every a predetermined interval, for example every from 0.5 to 12 hours, preferably every from 1 to 8 hours, it is possible to minimize the variation in the state of deterioration among the thermal decomposition furnaces and to control the thermal decomposition furnace system under a proper load distribution.

In the case of the method for controlling furnaces for thermal decomposition of a chlorinated hydrocarbon, the control factors for each thermal decomposition furnace include, for example, the outlet temperature of the thermal decomposition furnace ($x'_1$), the feeding rate of the chlorinated hydrocarbon starting material (such as 1,2-dichloroethane) or the opening degree of the starting material supply valve ($x'_2$), the outlet temperature of the heat exchanger for rapid cooling ($x'_4$), the temperature of convection section ($x'_5$), the surface temperature of the decomposition tube ($x'_6$) and the number of days in operation ($x'_7$), and the thermal decomposition furnace system can be controlled under proper load distribution depending upon the load allowances of the respective thermal decomposition furnaces in a manner similar to the manner as described above with respect to the method for controlling the furnaces for thermal decomposition of a hydrocarbon.

Further, in the above conversion reaction, the size of production of the conversion reaction product varies depending upon the reaction condition (the operational condition) of each reactor or upon the properties of the starting material.

For example, the size of production of an olefin such as ethylene or propylene in the thermal decomposition of a hydrocarbon, varies depending upon the thermal decomposition condition (the operational condition) of each decomposition furnace or upon the properties of the hydrocarbon starting material. Heretofore, it has been common to grasp the size of production of an olefin such as ethylene or propylene of the previous day and change the operational condition of each decomposition furnace once a day based on the results to secure the prescribed size of production of the olefin.

However, the size of production of an olefin such as ethylene or propylene varies substantially day to day due to a change in the properties of the hydrocarbon starting material source such as naphtha and due to a change in the operational condition caused by decoking treatment of the decomposition furnaces. Therefore, by the above-mentioned method of changing the operational condition of the furnaces once a day, it is difficult to secure the size of olefin production corresponding to the required size of olefin production. Further, the change of the operational condition is conducted on the basis of experience of the operator. Therefore, the operator is required to have a high degree of skill, and there are substantial differences among operators in the actual change of the operational condition. Besides, the operation is cumbersome.

Whereas, according to the method of the present invention, it has been made possible to bring the size of production of the conversion reaction product to a level corresponding to the required level of production by employing the concept of distributing the system load change to the respective reactors based on the above-mentioned load allowances.

Namely, for example, in the operation of furnaces for thermal decomposition of a hydrocarbon, it is ideal that a required type of olefin can be produced at a required level of production. However, in many cases, the actual size of production deviates from the required size of olefin production due to various factors. Under these circumstances, it has been made possible to produce a required olefin at a required level of production by calculating the deviation of the actual size of olefin production from the required size of olefin production as a system load change at short time intervals, and distributing the system load change to the respective thermal decomposition furnaces depending upon the above-mentioned load allowances to obtain a furnace load change, then determining values of control factors giving the size of olefin production corresponding to the furnace load change and changing the predetermined values of control factors accordingly. Hereinafter, this will be described in detail as "feed back control".

Further, it is also possible to control the size of production of the thermal decomposition reaction product at a constant level by preliminarily calculating an expected change in the size of production of the thermal decomposition reaction product due to the property change of the starting material for the thermal decomposition reaction from the property data of the starting material for the thermal decomposition reaction, determining the change in the size of production of the thermal decomposition reaction product attributable to the starting material based on the expected change, distributing the change to the respective thermal decomposition furnaces depending upon the load allowances, and changing the operational condition of each thermal decomposition furnace. This will be described in detail as "feed forward control".

Further, this feed forward control may be combined with the above-mentioned feed back control, whereby even when the property of the starting material undergoes a change, the production of the thermal decomposition reaction product corresponding to the required size of production can be conducted with high precision. This will be described hereinafter as "feed back and feed forward control".

Feed back control

The feed back control is basically a method for controlling a reactor system comprising a plurality of reactors for a conversion reaction, the operation of each of said reactors being controlled under predetermined values of selected control factors, which comprises:

(B-1) preliminarily obtaining (A) the above-mentioned load allowance function and (B) a function (hereinafter referred to as a "conversion reaction product yield function") representing the yield of each conversion reaction product in terms of the control factors of each reactor and the property factors of the starting material for the conversion reaction; and (B-2) during the operation of the reactor system, repeating:

(1) for each reactor, inputting data of the control factors to a computer to calculate a load allowance at predetermined time intervals;

(2) at short time intervals, (a) inputting data of the size of production of the conversion reaction product of the reactor system in operation (hereinafter referred to as an "actual size of production of the conversion reaction product") and data of the required size of production of the conversion reaction product (hereinafter referred to as a "required size of production of the conversion reaction product"), to a computer for comparison to calculate a system load change, (b) distributing the system load change calculated in step (a) to the reactors depending upon their respective load allowances calculated in step (1) to obtain a reactor load change, and (c)(i) calculating by means of the conversion reaction product yield function, values of control factors of each reactor giving a size of production (hereinafter referred to as a "required size of production") of the conversion reaction product corresponding to the reactor load change, and when the calculated values exceed the operational limits predetermined for the control factors of each reactor, adopting the operational limits as the values of control factors of each reactor, otherwise, adopting the calculated values as the values of control factors of each reactor, or (ii) calculating values of control factors of each reactor giving the size of production of the conversion reaction product closest to the required size of production of the conversion reaction product by means of the conversion reaction product yield function, subject to the operational limits of the control factors of each reactor as restrictive conditions or constraints, and adopting the calculated values as the values of control factors of each reactor; and (3) changing the predetermined values of control factors of each reactor to the adopted values of control factors.

Figure 3:
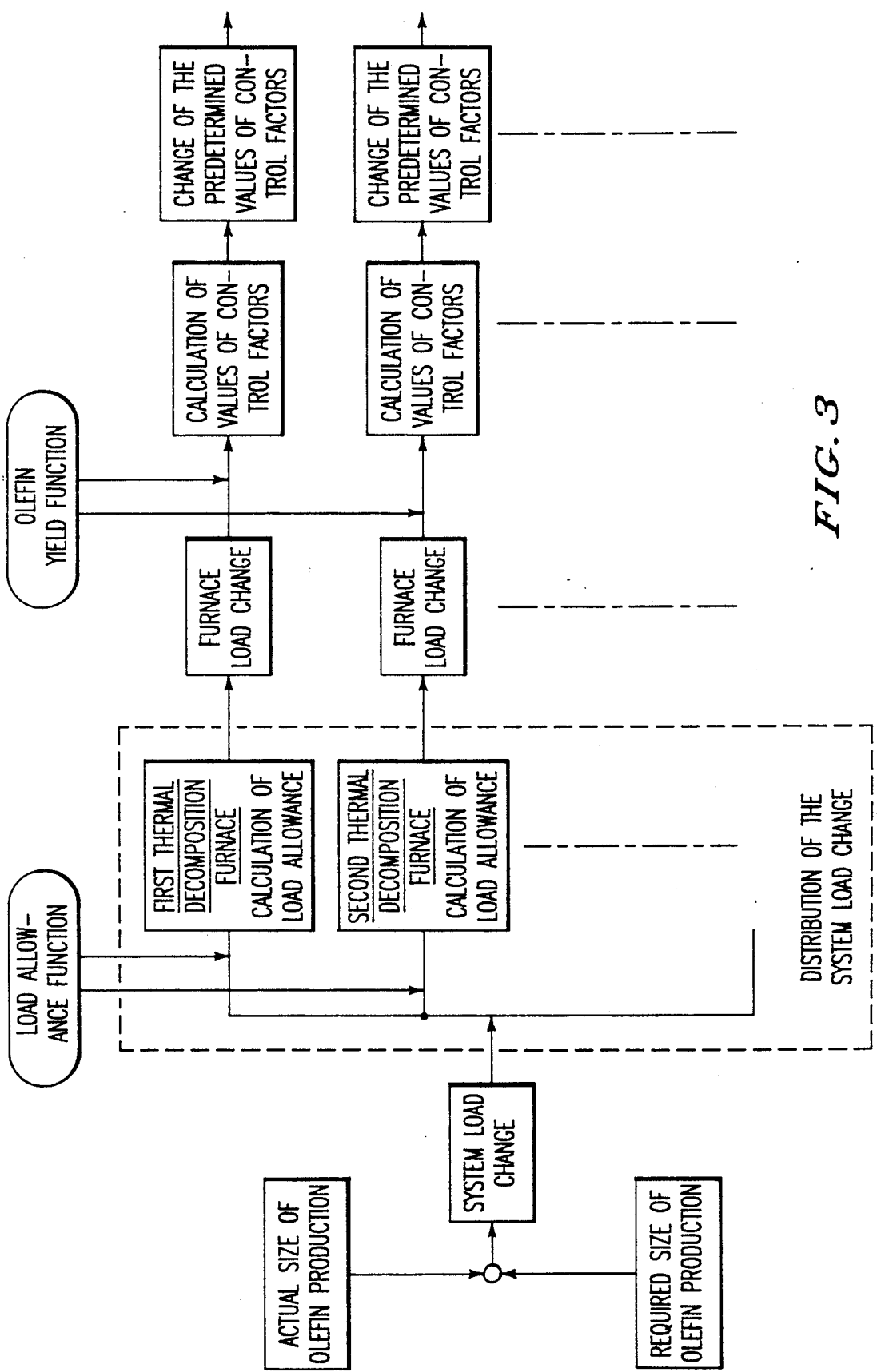
FIG. 3 is a block diagram showing the feed back control of a thermal decomposition furnace system by the controlling method of the present invention.

Referring to the case of the thermal decomposition of a hydrocarbon as shown in FIG. 3, for operation of the thermal decomposition furnace system, (1) the values of load allowances of each thermal decomposition furnace are calculated at predetermined time intervals by means of the load allowance function of (B-1)(A), and (2) at short time intervals, (a) the size of olefin production of the thermal decomposition furnace system in operation (actual size of olefin production) and the size of olefin production required (required size of olefin production) are compared to calculate a required change in the size of olefin production of the thermal decomposition furnace system (system load change), (b) the system load change is distributed to the thermal decomposition furnaces depending upon the respective load allowances to obtain a load change of each thermal decompsition furnace (furnace load change), and (c) values of control factors of each reactor giving a size of olefin production corresponding to the furnace load change are determined by means of the conversion reaction product yield function of (B-1)(B) (hereinafter referred to as an "olefin yield function"), and (3) the predetermined values of control factors of each thermal decomposition furnace are changed to the determined values of control factors. This series of operations is repeated for continuous operation.

Setting up of the conversion reaction product yield function

The size of production of the conversion reaction product produced in each reactor, can be represented by a function (conversion reaction product yield function) having the control factors of each reactor and the property factors of the conversion reaction starting material as variables. For the control of each reactor, the control factors are selected so that the operation can simply and reasonably be conducted, and the operation is controlled when the control factors are set to have proper values. Therefore, the function has the control factors and the factors representing the properties of the starting material of the conversion reaction, as variables.

There is no particular restriction as to the form of the converion reaction product yield function, so long as it properly reflects the changes of the control factors of each reactor and of the property factors of the conversion reaction starting material to the size of production of the conversion reaction product.

However, as will be described hereinafter, this function is used to obtain the values of control factors for changing the operational condition of each reactor, and it is therefore desirable to have a form as simple as possible by using proper control factors as variables, based on the comparison between the simplification for the computer control and the precision of the control.

Now, the conversion reaction product yield function in the case of the thermal decomposition reaction of a hydrocarbon i.e. the olefin yield function, will be described in detail.

The olefin yield function can be obtained experimentally. The following may be mentioned.

$$f_{ETY}(COT,SG) = a_0 + a_1 \cdot COT + a_2 \cdot SG \quad (1)$$

$$f_{PPY}(COT,SG) = b_0 + b_1 \cdot COT + b_2 \cdot SG \quad (2)$$

where
COT: outlet temperature Of the thermal decomposition furnace
SG: properties of the hydrocarbon starting material [specific gravity, composition (composition of a paraffin content, an olefin content and a naphthene content, or values obtained by the elemental analysis), or values of the distillation test (boiling point ranges), etc.]
$f_{ETY}(COT,SG)$: ethylene yield function
$f_{PPY}(COT,SG)$: propylene yield function
$a_0$–$a_2$ and $b_0$–$b_2$: coefficients (determined experimentally).

In the calculation of the values of control factors for each thermal decomposition furnace as described hereinafter in (2)(c), the above olefin yield function is used as follows.

The size of olefin production can be represented by the following equations:

$$ETYc = f_{ETY}(COT,SG) \cdot NAP \quad (3)$$

$$PPYc = f_{PPY}(COT,SG) \cdot NAP \quad (4)$$

where
ETYc: size of ethylene production
PPYc: size of propylene production
NAP: feeding rate of the hydrocarbon starting material.

Thus, the values of control factors for each thermal decomposition furnace, i.e. the values of COT(K) and NAP(K), giving the size of olefin production corresponding to the furnace load change, can be calculated by the following equations:

$$\begin{aligned}\Delta ETYc = & f_{ETY}(COT(K),SG(K)) \cdot NAP(K) \\ & - f_{ETY}(COT(K-1),SG(K-1)) \cdot NAP(K-1)\end{aligned} \quad (5)$$

$$\begin{aligned}\Delta PPYc = & f_{PPY}(COT(K),SG(K)) \cdot NAP(K) \\ & - f_{PPY}(COT(K-1),SG(K-1)) \cdot NAP(K-1)\end{aligned} \quad (6)$$

where
$\Delta ETYc$: ethylene furnace load change,
$\Delta PPYc$: propylene furnace load change,
COT(K): outlet temperature of the thermal decomposition furnace as measured on the Kth time,
COT(K−1): outlet temperature of the thermal decomposition furnace as measured on the (K−1)th time,
SG(K): properties of the hydrocarbon starting material as measured on the Kth time,
SG(K−1): properties of the hydrocarbon starting material as measured on the (K−1)th time.

(1) Calculation of the load allowance

To the load allowance function of (B-1)(A), the measured data of the control factors (variables) for controlling the operation of each reactor, are inserted to calculate a load allowance for each reactor. The timing for calculation of the load allowance, may be determined in connection with the time intervals for conducting the control operation under (2) et seq. It is preferred to calculate the load allowance at a time as close as possible to the time for operation under (2) et seq, so that the control operation can be conducted in a state where the condition of each reactor is better reflected.

(2)(a) Calculation of the system load change

The size of production of the conversion reaction product of the reaction system in operation (actual size of production of the conversion reaction product) and the size of production of the conversion reaction product required (required size of production of the conversion reaction product) are compared at short time intervals, to calculate the change in the size of production of the conversion reaction product of the reactor system (system load change) each time.

There is no particular restriction as to the manner of grasping the actual size of production of the conversion reaction product, so long as the actual value can thereby be obtained. For example, in the thermal decomposition of a hydrocarbon, there may be mentioned a method of grasping it in terms of the accumulation rate in tanks and/or the discharge rate of an olefin product such as product ethylene or product propylene, or a method of grasping it in terms of the supply rate and the withdrawal rate of the crude olefin to be sent to the distillation purification system.

The actual size of production of the conversion reaction product is input to a computer together with the required size of production of the conversion reaction product, to calculate the system load change at proper time intervals, for example, every predetermined interval, usually every from 3 to 10 hours, preferably every from 3 to 8 hours, followed by the operation under (2)(b) et seq.

There is no particular restriction as to the manner for the calculation of the system load change. For example, in the case of the thermal decomposition of a hydrocarbon, it is usual to multiply the difference between the actual size of olefin production and the required size of olefin production by a proper coefficient (gain) to obtain the system load change.

$$\Delta ETY_1 = \frac{1}{M}(ETY_R - ETY_A) \quad \text{(B-I)}$$

$$\Delta PPY_1 = \frac{1}{M}(PPY_R - PPY_A) \quad \text{(B-II)}$$

where
$ETY_A$: actual size of ethylene production
$ETY_R$: required size of ethylene production
$\Delta ETY_1$: ethylene system load change
$PPY_A$: actual size of propylene production
$PPY_R$: required size of propylene production
$\Delta PPY_1$: propylene system load change
M: numerical value selected within a range of from 1 to 10

(2)(b) Distribution of the system load change

The system load change obtained as above is distributed to the reactors depending upon the load allowances of the respective reactors as obtained in the above (1). The distribution is conducted preferably in accordance with the following equation.

$$\begin{pmatrix} \text{Reactor load} \\ \text{change} \end{pmatrix} = \begin{pmatrix} \text{System load} \\ \text{change} \end{pmatrix} \times \frac{\begin{pmatrix} \text{Load allowance} \\ \text{of each reactor} \end{pmatrix}}{\Sigma \begin{pmatrix} \text{Load allowance} \\ \text{of each reactor} \end{pmatrix}}$$

However, if the precision of the load allowance function is inadequate, and the operational condition of a certain reactor is reflected too much or too little, a proper coefficient may be introduced for correction to the above equation on the basis of experience.

(2)(c) Determination of the values of control factors for each reactor

The values of control factors for each reactor giving the size of production of the conversion reaction product corresponding to the reactor load change i.e. the load change for each reactor distributed under the above (2)(b) (required size of production of the conversion reaction product), are determined by means of the above-mentioned conversion reaction product yield function in accordance with one of the following methods (i) and (ii).

(i) Values of control factors of each reactor giving the required size of production of the conversion reaction product are calculated by means of the conversion reaction product yield function, and when the calculated values exceed the operational limits predetermined for the control factors for each reactor, the operational limits will be adopted as the values of control factors for each reactor. Otherwise, the calculated values will be adopted as the values of control factors of each reactor.

(ii) Values of control factors of each reactor giving the size of production of the conversion reaction product closest to the required size of production of the conversion reaction product are calculated by means of the conversion reaction product yield function, subject to the operational limits of the control factors of each reactor as restrictive conditions, and the calculated values will be adopted as the values of control factors of each reactor.

In the above (i), when only a part of the values of control factors for each reactor calculated by means of the conversion reaction product yield function, exceeds the operational limit, a part of the conversion reaction product yield function may be preferentially treated for recalculation. (For example in the case where the above equations (5) and (6) are used, one of the ethylene yield and the propylene yield is preferentially treated to give a sufficient solution thereto.)

With respect to the above (ii), a specific example of the calculation will be described wherein the above equations (5) and (6) are used.

With respect to $NAP(K)$ and $COT(K)$, the above equations (5) and (6) may be rearranged as follows:

$$b = Ax \qquad (7)$$

$$b = \begin{pmatrix} \Delta ETYc + NAP(K-1) \cdot f_{ETY}(COT(K-1), SG(K-1)) \\ \Delta PPYc + NAP(K-1) \cdot f_{PPY}(COT(K-1), SG(K-1)) \end{pmatrix}$$

$$A = \begin{pmatrix} a_0 + a_2 \cdot SG(K) & a_1 \\ b_0 + b_2 \cdot SG(K) & b_1 \end{pmatrix}$$

$$x = \begin{pmatrix} NAP(K) \\ NAP(K) \cdot COT(K) \end{pmatrix}$$

The restrictive conditions are as follows:

$$MAX\{LoCOT, COT(K-1) - \Delta COT\} \leq COT(K)$$

$$\leq MIN\{HiCOT, COT(K-1) + \Delta COT\} \qquad (8)$$

$$MAX\{LoNAP, NAP(K-1) - \Delta NAP\} \leq NAP(K)$$

$$\leq MIN\{HiNAP, NAP(K-1) + \Delta NAP\} \qquad (9)$$

where
HiCOT: upper limit of the outlet temperature of the thermal decomposition furnace
LoCOT: lower limit of the outlet temperature of the thermal decomposition furnace
HiNAP: upper limit of the feeding rate of the hydrocarbon starting material or the opening degree of the hydrocarbon starting material supply valve
LoNAP: lower limit of the feeding rate of the hydrocarbon starting material or the opening degree of the hydrocarbon starting material supply valve
$\Delta$COT: maximum change of the outlet temperature of the thermal decomposition furnace
$\Delta$NAP: maximum change of the feeding rate of the hydrocarbon starting material or the opening degree of the hydrocarbon starting material supply valve.

When:

$$k_1 = MAX\{LoCOT, COT(K-1) - \Delta COT\}$$

$$k_2 = MIN\{HiCOT, COT(K-1) + \Delta COT\}$$

$$l_1 = MAX\{LoNAP, NAP(K-1) - \Delta NAP\}$$

$$l_2 = MIN\{HiNAP, NAP(K-1) + \Delta NAP\},$$

the equations (8) and (9) may be summarized as follows:

$$Cx \leq d \qquad (10)$$

$$C = \begin{pmatrix} k_1 & -1 \\ -k_2 & 1 \\ -1 & 0 \\ 1 & 0 \end{pmatrix}$$

-continued $$d = \begin{pmatrix} 0 \\ 0 \\ -l_1 \\ -l_2 \end{pmatrix} \quad 5$$

Thus, COT(K) and NAP(K) can be determined by obtaining the value of x which minimizes $|Ax-b|^2$ (optimum solution $x^*$) under the restrictive conditions of the equation (10). The optimum solution $x^*$ to this problem is required to meet the following Kuhn-Tucker condition:

$$\begin{cases} A^T A x^* - A^T b + Cu = 0 & (11) \\ Cx^* \leq d & (12) \\ u \geq 0 & (13) \\ (Cx^* - d) \cdot u = 0 & (14) \end{cases}$$

where u: Lagrange multipliers vector variable.

Further, when two kinds of hydrocarbons are used as starting material (combined decomposition), the calculation can be conducted in a similar manner. For example, when naphtha and LPG are used in combination, the equations (3) and (4) will be as follows:

$$ETYc = f_{ETY}(COT,SG) \cdot NAP + g_{ETY}(COT) \cdot LPG \quad (15)$$

$$PPYc = f_{PPY}(COT,SG) \cdot NAP + g_{PPY}(COT) \cdot LPG \quad (16)$$

where
$f_{ETY}(COT,SG)$: ethylene yield function (naphtha starting material)
$f_{PPY}(COT,SG)$: propylene yield function (naphtha starting material)
$g_{ETY}(COT)$: ethylene yield function (LPG starting material)
$g_{PPY}(COT)$: propylene yield function (LPG Starting material)
NAP: feeding rate of naphtha,
LPG: feeding rate of LPG.

Accordingly, the equations corresponding to the above equations (5) and (6) will be as follows:

$$\Delta ETYc = f_{ETY}(COT(K),SG(K)) \cdot NAP(K) + \quad (17)$$
$$g_{ETY}(COT(K)) \cdot LPG(K) - F_{ETY}(COT(K-1),SG(K-1)) \cdot$$
$$NAP(K-1) - g_{ETY}(COT(K-1)) \cdot LPG(K-1)$$

$$\Delta PPYc = f_{PPY}(COT(K),SG(K))) \cdot NAP(K) + \quad (18)$$
$$g_{PPY}(COT(K)) \cdot LPG(K) - f_{PPY}(COT(K-1),SG(K-1)) \cdot$$
$$NAP(K-1) - g_{PPY}(COT(K-1)) \cdot LPG(K-1)$$

Thus, by inserting:

$$\begin{cases} g_{ETY}(COT) = a'_0 + a'_1 COT \\ g_{PPY}(COT) = b'_0 + b'_1 COT \end{cases}$$

-continued $$\begin{cases} \alpha_0 = \Delta ETYc + \{a_0 + a_1 COT(K-1) + \\ \quad a_2 SG(K-1)\} \cdot NAP(K-1) + \{a'_0 + \\ \quad a'_1 COT(K-1)\} \cdot LPG(K-1) - a'_0 \cdot LPG(K) \\ \beta_0 = \Delta PPYc + \{b_0 + b_1 COT(K-1) + \\ \quad b_2 SG(K-1)\} \cdot NAP(K-1) + \{b'_0 + \\ \quad b'_1 COT(K-1)\} \cdot LPG(K-1) - b'_0 \cdot LPG(K) \end{cases}$$

$$\begin{cases} \alpha_1 = a_0 + a_2 \cdot SG(K) \\ \beta_1 = b_0 + b_2 \cdot SG(K) \end{cases}$$

$$\begin{cases} \alpha_2 = a'_1 \cdot LPG(K) \\ \beta_2 = b'_1 \cdot LPG(K) \end{cases}$$

$$\begin{cases} \alpha_3 = a_1 \\ \beta_3 = b_1 \end{cases}$$

$$\begin{cases} x = NAP(K) \\ y = COT(K), \end{cases}$$

the equations (17) and (18) will be as follows:

$$\alpha_0 = \alpha_1 x + \alpha_2 y + \alpha_3 xy \quad (21)$$

$$\beta_0 = \beta_1 x + \beta_2 y + \beta_3 xy \quad (22)$$

Thus, in the same manner as in the case of a single type of the hydrocarbon starting material, COT(K) and NAP(K) can be determined by obtaining the values of x and y (optimum solutions $(x^*, y^*)$) which minimize:

$$F(x,y) = (\alpha_1 x + \alpha_2 y + \alpha_3 xy - \alpha_0)^2 + (\beta_1 x + \beta_2 y + \beta_3 x y - \beta_0)^2 \quad (24)$$

under the restrictive conditions of:

$$g_i(x,y) \leq 0 (i = 1-4) \quad (23)$$

$$\begin{cases} G_1(x,y) = x - l_2 \leq 0, \ G_2(x,y) = -x + l_1 \leq 0, \\ G_3(x,y) = y - k_2 \leq 0, \ G_4(x,y) = -y + k_1 \leq 0. \end{cases}$$

The optimum solutions $(x^*, y^*)$ to this problem are required to satisfy the following Kuhn-Tucker condition.

$$\begin{cases} \dfrac{\partial F}{\partial x} + \sum\limits_{i=1}^{4} \lambda_i \cdot \dfrac{\partial G_i}{\partial x} = 0 & (25) \\ \dfrac{\partial F}{\partial y} + \sum\limits_{i=1}^{4} \lambda_i \cdot \dfrac{\partial G_i}{\partial y} = 0 & (26) \\ \lambda_i = 0 & (27) \\ G_i \leq 0 & (28) \\ \lambda_i \cdot G_i = 0 (i = 1-4) & (29) \end{cases}$$

where $\lambda_i$: Lagrange multipliers (3) Changing the operational condition of each reactor The predetermined values of control factors of each reactor are changed to the values of control factors determined in the above (2)(c), followed by continuous operation of the reactor system.

For example, in order to provide the outlet temperature of the thermal decomposition furnace COT(K) and the feeding rate of the hydrocarbon starting material NAP(K) as obtained in the above (2)(c), for example, the opening degree of the hydrocarbon starting material supply valve of each thermal decomposition furnace is changed so that the feeding rate of the hydrocarbon starting material is adjusted to the determined level, and the opening degree of the fuel supply valve for heating the thermal decomposition furnace is changed to adjust the feeding rate of the fuel so that the outlet temperature of the thermal decomposition furnace will be controlled to the determined temperature.

According to this method, for the operation of the reactor system, data of the control factors of each reactor, data of the actual size of production of the conversion reaction product and data of the required size of production of the conversion reaction product, are input to a computer, so that the control by the above-mentioned series of operations for changing the operational condition of each reactor, is conducted at short time intervals, whereby the change of the operational condition to obtain the desired size of production of the conversion reaction product can be conducted simply, properly and efficiently.

In the thermal decomposition of a hydrocarbon, the desired size of production of the thermal decomposition product can be obtained efficiently by conducting the control by this method every predetermined period of time, for example every from 3 to 10 hours, preferably every from 3 to 8 hours.

Feed forward control

The feed forward control is conducted basically by a method for controlling a thermal decomposition furnace system comprising a plurality of thermal decomposition furnaces, the operation of each of said furnaces being controlled under predetermined values of selected control factors, which comprises:

(C-1) preliminarily obtaining (A) a load allowance function, and (B) a function (hereinafter referred to as a "conversion reaction product yield function") representing the yield of each thermal decomposition reaction product in terms of the control factors of each thermal decomposition furnace and the property factors of the starting material of the thermal decomposition reaction, as variables; and (C-2) during the operation of the thermal decomposition furnace system, repeating:

(1) for each thermal decomposition furnace, inputting data of the control factors to a computer to calculate a load allowance, at predetermined time intervals;

(2) for changing the starting material of the thermal decomposition reaction to a starting material having different properties, (a) inputting data of the property factors of the starting material for the thermal decomposition reaction prior to the change and data of the property factors of the starting material for the thermal decomposition reaction after the change for comparison to calculate an expected change (hereinafter referred to as an "expected change of the thermal decomposition reaction product of the system") in the size of production of the thermal decomposition reaction product of the thermal decomposition furnace system by means of the conversion reaction product yield function based on the change, (b) determining a change (hereinafter referred to as a "starting material-based system load change") in the size of production of the thermal decomposition reaction product of the thermal decomposition furnace system corresponding to the expected change of the thermal decomposition reaction product of the system to cancel out the change in the size of production of the thermal decomposition reaction product corresponding to the expected change of the thermal decomposition reaction product of the system, (c) distributing the starting material based system load change calculated in step (b) to the thermal decomposition furnaces depending upon their respective load allowances calculated in step (1) to obtain a load change (hereinafter referred to as a "furnace load change") of each thermal decomposition furnace, and (d)(i) calculating by means of the conversion reaction product yield function, values of control factors of each thermal decomposition furnace giving a size of production (hereinafter referred to as a "required size of production") of the thermal decomposition reaction product corresponding to the furnace load change, and when the calculated values exceed the operational limits predetermined for the control factors of each thermal decomposition furnace, adopting the operational limits as the values for control factors of each thermal decomposition furnace, otherwise, adopting the calculated values as the values for control factors of each thermal decomposition furnace, or (ii) calculating values of control factors of each thermal decomposition furnace giving the size of production of the thermal decomposition reaction product closest to the required size of production of the thermal decomposition reaction product by means of the conversion reaction product yield function, subject to the operational limits of the control factors of each thermal decomposition furnace as restrictive conditions, and adopting the calculated values as the values for control factors of each thermal decomposition furnace; and (3) changing the predetermined values of control factors of each thermal decomposition furnace to the adopted values of control factors.

Figure 4:
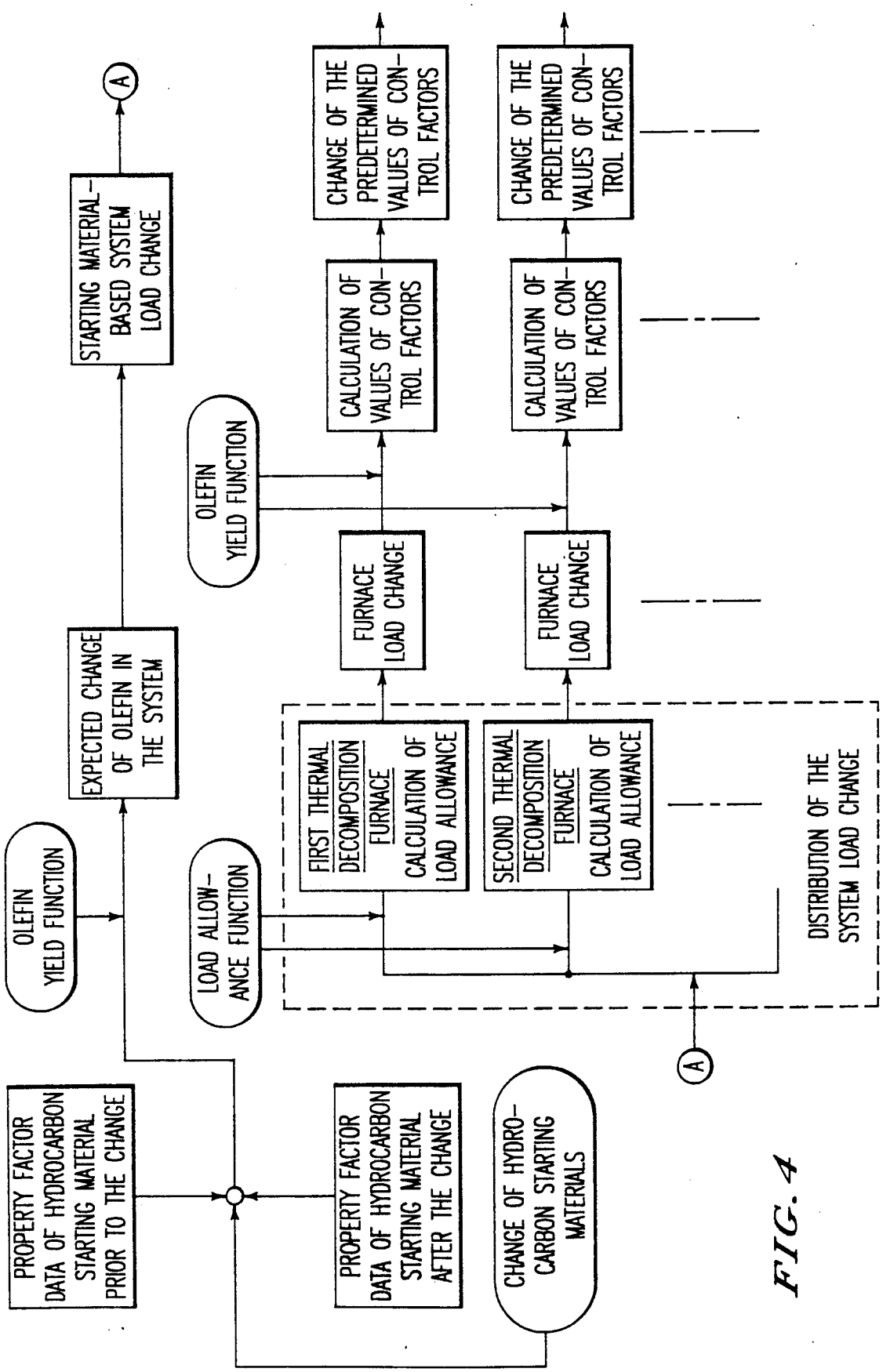
FIG. 4 is a block diagram showing the feed forward control of a thermal decomposition furnace system by the controlling method of the present invention.

Namely, as shown in FIG. 4, in the operation of the furnace system for thermal decomposition of a hydrocarbon, (1) the load allowance of each thermal decomposition furnace is calculated by means of the load allowance function as mentioned in (C-1)(A) at predetermined time intervals, and (2) for changing the hydrocarbon starting material, (a) data of the property factors of the hydrocarbon starting material before the change are compared with data after the change, and the expected change of the thermal decomposition reaction product of the system is calculated from the change by means of the conversion reaction product yield function as described in (C-1)(B) (hereinafter referred to as the "olefin yield function"), (b) the starting material-based system load change is determined to cancel out the change in the size of olefin production corresponding to the expected change of the olefin of the system, (c) the starting material-based system load change is distributed to the thermal decomposition furnaces depending upon the respective allowances to obtain a furnace load change, and (d) for each thermal decomposition furnace, values of control factors giving the size of the olefin production corresponding to the furnace load change are determined by means of the olefin yield function, and (3) the predetermined values of control factors of each thermal decomosition furnace are changed to the determined values of control factors.

(1) Calculation of the load allowance

To the above load allowance function, the measured data of control factors (variables) for controlling the operation of each thermal decomposition furnace, are inserted to calculate the load allowance for each thermal decomposition furnace. The timing for calculation of the load allowance may be determined in connection with the time intervals for the control operation of (2) et seq as described hereinafter. It is preferred to calculate the load allowance of each thermal decomposition furnace at a time as close as possible to the time for carrying out the operation of (2) et seq, so that the control operation can be conducted in a state where the condition of each thermal decompsotion furnace is better reflected.

(a) Calculation of the expected change of the thermal decomposition reaction product of the system The starting material for the thermal decomposition reaction to be supplied is not always of constant properties, and in many cases, the starting material of the thermal decomposition reaction is changed to a material having different properties, during the operation of the thermal decomposition furnaces. In such a case, according to this method, data cf the property factors of the starting material of the thermal decomposition reacton prior to the change and data of the property factors of the starting material of the thermal decomposition reaction after the change are input to a computer and compared, and the expected change in the size of production of the thermal decomposition reaction product of the thermal decomposition furnace system (the expected change of the thermal decomposition product of the system) is calculated from the change by means of the conversion reaction product yield function.

For example, the property factors of the hydrocarbon starting material for the thermal decomposition reaction of a hydrocarbon include the specific gravity, the composition and the distillation test values (i.e. boiling point ranges) as mentioned above. There is no particular restriction as to the manner of grasping data of these property factors. For each property factor, the change ($\Delta SG$) in the data after the change over before the change is obtained, and the change in the size of olefin production expected by the property change of the hydrocarbon starting material (expected change of olefin of the system) is calculated by means of the olefin yield function, based on the above-mentioned equation (3) or (4).

Namely, the change in the size of olefin production expected by the property change of the hydrocarbon starting material is represented by the following equations:

$$\Delta ETYe = a_2 \cdot \Delta SG \cdot NAP \quad (30)$$

$$\Delta PPYe = b_2 \cdot \Delta SG \cdot NAP \quad (31)$$

where
$\Delta ETYe$: expected change of ethylene of the system
$\Delta PPYe$: expected change of propylene of the system
$\Delta SG$: property change of the hydrocarbon starting material.

In a case where the property change of the hydrocarbon starting material is anticipated, the above-mentioned change may be obtained at such time. However, in order to prevent a variation in the size of olefin production due to a fine property change or an unexpected property change, the change may be measured at predetermined time intervals, for example, at a periodical cycle of e.g. every from 0.5 to 5 hours, preferably every from 1 to 2 hours, whereby fine control can be conducted.

(2)(b) Determination of the starting material-based system load change

The variation of the size of the production due to a change of the starting material can be prevented by cancelling out the change of the size of production of the thermal decomposition reaction product correspoonding to the expected change of the thermal decomposition reaction product of the system as obtained in the above step (a). Therefore, the change of the size of production of the thermal decomposition reaction product of the thermal decomposition furnace system corresponding to the expected change of the thermal decomposition reaction product of the system (the starting material-based system load change) is determined.

Namely, for example, the starting material-based system load changes corresponding to the equations (30) and (31) will be as follows:

$$\Delta ETY_2 = -\Delta ETY_e \quad (32)$$

$$\Delta PPY_2 = -\Delta PPY_e \quad (33)$$

where
$\Delta ETY_2$: ethylene starting material-based system load change
$\Delta PPY_2$: propylene starting material based system load change (2)(c) Calculation of the furnace load change The above starting material-based system load change is distributed to the thermal decomposition furnaces depending upon the load allowances of the respective thermal decomposition furnaces obtained in the above step (1). The distribution is preferably conducted in accordance with the following equation.

$$\begin{pmatrix} \text{Furnace load} \\ \text{change} \end{pmatrix} = \begin{pmatrix} \text{Starting material } - \\ \text{based system} \\ \text{load change} \end{pmatrix} \times \frac{\begin{pmatrix} \text{Load alowance} \\ \text{of each thermal} \\ \text{decomposition furnace} \end{pmatrix}}{\Sigma \begin{pmatrix} \text{Load allowance} \\ \text{of each thermal} \\ \text{decomposition furnace} \end{pmatrix}}$$

However, if the precision of the load allowance function is inadequate, and the operational condition of a certain thermal decomposition furnace is reflected too much or too little, a proper coeffient may be introduced for correction to the above equation on the basis of experience.

(2)(d) Determination of the values of control factors for each thermal decomposition furnace Values of control factors of each thermal decomposition furnace giving the size of production of the thermal decomposition reaction product corresponding to the furnace load change (the required size of production of the thermal decomposition reaction product), are determined by means of the above mentioned conversion reaction product yield function by one of the following steps (i) and (ii).

(i) Values of control factors of each thermal decomposition furnace giving the required size of olefin production, are calculated by means of the olefin yield function, and when the calculated values exceed the operational limits predetermined for the control factors of each thermal decomposition furnace, the operational limits will be adopted as the values of control factors of each thermal decomposition furnace. Otherwise the calculated values will be adopted as the values of control factors of each thermal decomposition furnace.

(ii) Values of control factors of each thermal decomposition furnace giving the size of olefin production closest to the required size of olefin production is calculated by means of the olefin yield function, subject to the operational limits of the control factors of each thermal decomposition furnace as restrictive conditions, and the calculated values will be adopted as the values for control factors of each thermal decomposition furnace.

For the calculation of the values of the control factors of each thermal decomposition furnace, the conversion reaction product yield function will be used as follows.

From the above equations (3) and (4), furnace load changes may be represented as follows:

$$\Delta ETYc = f_{ETY}(COT(K), SG(K)) \cdot NAP(K) \\ - f_{ETY}(COT(K-1), SG(K-1)) \cdot NAP(K-1) \quad (34)$$

$$\Delta PPYc = f_{PPY}(COT(K), SG(K)) \cdot NAP(K) \\ - f_{PPY}(COT(K-1), SG(K-1)) \cdot NAP(K-1) \quad (35)$$

where
$\Delta ETYc$: ethylene furnace load change
$\Delta PPYc$: propylene furnace load change
$COT(K)$: outlet temperature of the thermal decomposition furnace as measured on the Kth time
$COT(K-1)$: outlet temperature of the thermal decomposition furnace as measured on the $(K-1)$th time
$SG(K)$: property values of the hydrocarbon starting material as measured on the Kth time
$SG(K-1)$: property values of the hydrocarbon starting material as measured on the $(K-1)$th time Thus, the values of control factors of each thermal decomposition furnace giving the size of olefin production corresponding to the furnace load change i.e. $COT(K)$ and $NAP(K)$, can be calculated.

The calculation of the values of control factors can be made in the same manner as described above in (B-2)(2)(c)(i) and (ii).

(3) Changing the operational condition of each thermal decomposition furnace

The predetermined values of control factors of each thermal decomposition furnace, are changed to the values of control factors determined in the above step (2)(d), followed by continuous operation of the thermal decomposition furnace system.

For example, in the thermal decomposition of a hydrocarbon, in order to give the outlet temperature of the thermal decomposition furnace $COT(K)$ and the feeding rate of the hydrocarbon starting material $NAP(K)$ as obtained under the above step (2)(d), the opening degree of the hydrocarbon starting material supply valve for each thermal decomposition furnace is changed to adjust the feeding rate of the hydrocarbon starting material at the determined level, and the opening degree of the fuel supply valve for heating the thermal decomposition furnace is changed to adjust the fuel supply so that the outlet temperature of the thermal decomposition furnace is controlled to the determined temperature.

Feed back and feed forward control

The feed back and feed forward control is conducted by a method for controlling a thermal decomposition furnace system comprising a plurality of thermal decompostion furnaces, the operation of each of said furnaces being controlled under predetermined values of selected control factors, which comprises:

(D-1) preliminarily obtaining (A) a load allowance function, and (B) a conversion reaction product yield function; and (D-2) during the operation of the thermal decomposition furnace system, repeating:

(I) for each thermal decomposition furnace, inputting data of the control factors to a computer to calculate a load allowance at predetermined time intervals; and (II)(1) at short time intervals, (a) inputting data of the size of production of the thermal decomposition reaction product of the thermal decomposition furnace system in operation (hereinafter referred to as an "actual size of production of the thermal decomposition reaction product") and data of the required size of production of the thermal decomposition reaction product (hereinafter referred to as a "required size of production of the thermal decomposition reaction product") to a computer for comparison to calculate a required change (hereinafter referred to as a "system load change") in the size of production of the thermal decomposition reaction product of the thermal decomposition furnace system, (b) distributing the system load change to the thermal decomposition furnaces depending upon their respective load allowances calculated in step (I) to obtain a load change (hereinafter referred to as a "furnace load change") of each thermal decomposition furnace, and (c)(i) calculating by means of the conversion reaction product yield function, values of the control factors of each thermal decomposition furnace giving a size of production of the thermal decomposition reaction product (hereinafter referred to as a "required size of production") of the thermal decomposition reaction product corresponding to the furnace load change, and when the calculated values exceed the operational limits predetermined for the control factors of each thermal decomposition furnace, adopting the operational limits as the values of control factors for each thermal decomposition furnace, otherwise adopting the calculated values as the values of control factors of each thermal decomposition furnace, or (ii) calculating values of the control factors of each thermal decomposition furnace giving the size of production of the thermal decomposition reaction product closest to the required size of production of the thermal decomposition reaction product by means of the conversion reaction product yield function, subject to the operational limits of the control factors of each thermal decomposition furnace as restrictive conditions, and adopting the calculated values as the values for control factors of each thermal decomposition furnace; and (2) changing the predetermined values of control factors of each thermal decomposition furnace to the adopted values of control factors;

wherein (III) for changing the starting material of the thermal decomposition reaction to a starting material having different properties, (a) inputting data of the property factors of the starting material of the thermal decomposition reaction prior to the change and data of the property factors of the starting material for the thermal decomposition reaction after the change for comparison to calculate an expected change (hereinafter referred to as an "expected change of the thermal decomposition reaction product of the system") in the size of production of the thermal decomposition reaction product of the thermal decomposition furnace system by means of the conversion reaction product yield function based on the change, (b) determining a change (hereinafter referred to as a "starting material-based system load change") in the size of production of the thermal decomposition reaction product of the thermal decomposition reaction system corresponding to the expected change of the thermal decomposition reaction product of the system to cancel out the change in the size of production of the thermal decomposition reaction product corresponding to the expected change of the thermal decomposition reaction product of the system, and (c) replacing the system load change in step (II)(1)(b) by the total of the system load change calculated in step (II)(1)(a) and the starting material-based system load change.

Figure 5A:
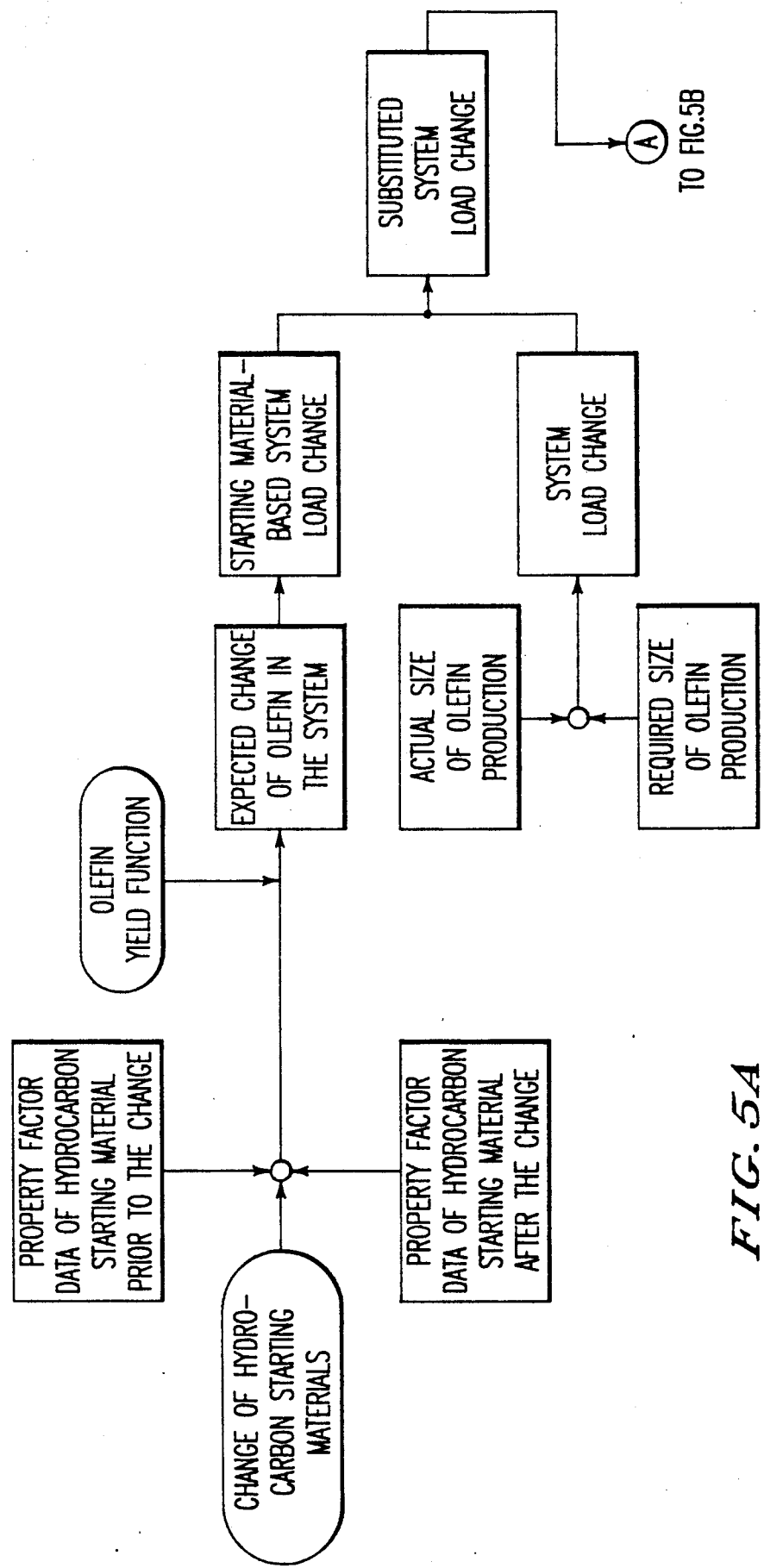
FIG. 5 is a block diagram showing the feed back and feed forward control of a thermal decomposition furnace system by the controlling method of the present invention.
Figure 5B:
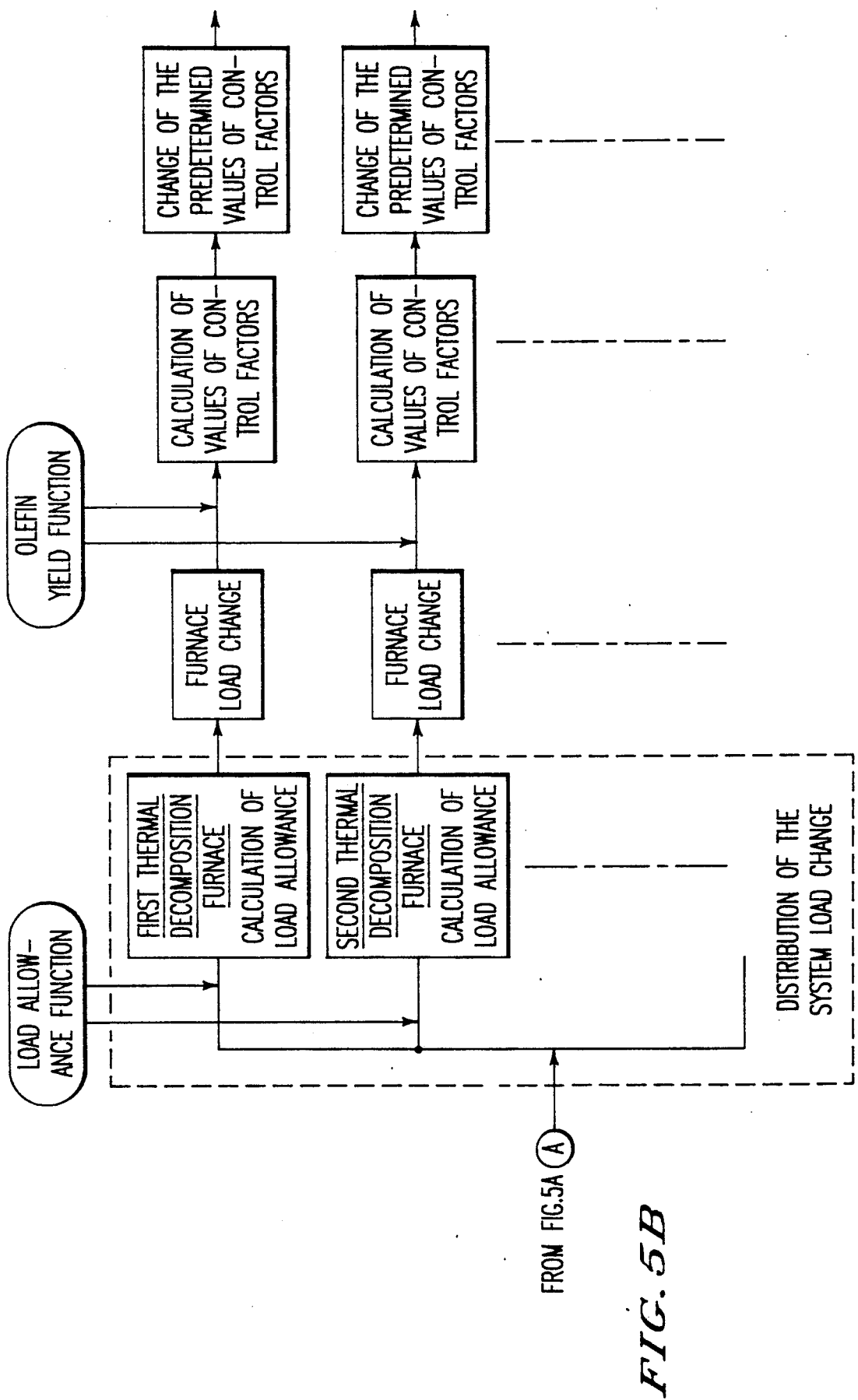

Namely, as shown in FIG. 5, for example, in the thermal decomposition of a hydrocarbon, (I) the load allowance of each thermal decomposition furnace is calculated in the same manner as described above at predetermined time intervals, and (II)(1) at short time intervals, (a) the size of olefin production of the thermal decomposition furnace system in operation (actual size of olefin production) and the size of olefin production required (required size of olefin production) are compared to calculate a change in the size of olefin production of the thermal decomposition furnace system (system load change), (b) the system load change is distributed to thermal decomposition furnaces depending upon their respective load allowances to obtain a load change of each thermal decomposition furnace (furnace load change), (c) values of control factors giving the size of olefin production corresponding to the furnace load change for each thermal decomposition furnace are determined by means of the conversion reaction product yield function of (D-I)(B) (hereinafter referred to as an "olefin yield function"), and (2) changing the perdetermined values of control factors of each thermal decomposition furnace to the determined values of control factors, repeatedly, and (III) for changing the hydrocarbon starting material, (a) data of the property factors of the hydrocarbon starting material before the change and the data after the change are compared to calculate the expected change of olefin of the system from the change by means of the olefin yield function, (b) the starting material-based system load change is determined to cancel out the change in the size of olefin production corresponding to the expected change of olefin of the system, and (c) the total of the system load change calculated in the above (II)(1)(a) and the starting material-based system load change, is substituted for the system load change of the above (II)(1)(b).

Namely, the total of the system load change of the above described feed back control and the starting material-based system load change in the above described feed forward control, is substituted for the system load change, whereby both of the feed back control and the feed forward control are efficiently applied to the thermal decomposition furnace system.

Specifically, the operation will be conducted as follows.

Namely, the sum obtained by adding the starting material-based system load change in the feed forward control as calculated by the above equations (32) and (33) ($\Delta ETY_2$, $\Delta PPY_2$) to the system load change obtained in the calculation of the system load change in the above described feed back control ($\Delta ETY_1$, $\Delta PPY_1$), is substituted for the system load change.

$$\Delta ETY = \Delta ETY_1 + \Delta ETY_2$$

$$\Delta PPY = \Delta PPY_1 + \Delta PPY_2$$

Then, the substituted system load change ($\Delta ETY$, $\Delta PPY$) is distributed to the respective thermal decomposition furnaces in the same manner as described in the above feed back control to obtain values of control factors of each thermal decomposition furnace, and the operational condition of each thermal decomposition furnace is changed.

By this method, the feed forward control and the feed back control are simultaneously and efficiently conducted.

The above-mentioned feed forward control is conducted when the properties of the starting material have changed, and the above-mentioned feed back control is conducted continuously during the operation of the thermal decomposition furnaces. Therefor, the timing for conducting the method of the feed back and feed forward control wherein both controls are conducted simultaneously, is determined depending upon the manner of operation of the thermal decomposition furnaces and the inter-relation between the controls.

Now, the present invention will be described in further detail with reference to the Examples. However, it should be understood that the present invention is by no means restricted by such specific Examples.

EXAMPLE 1 (Grasping of the condition of each reactor by means of a load allowance function)

Figure 6:
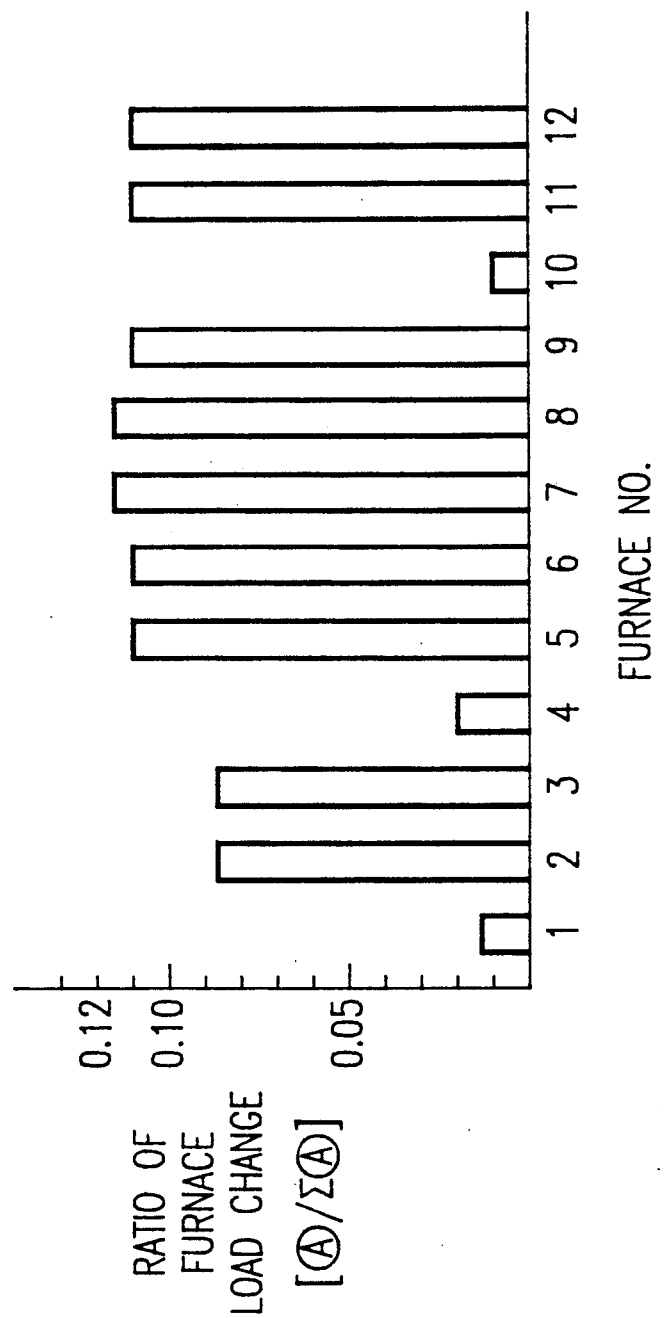
FIGS. 6 and 7 are graphs showing the ratios of the furnace load changes when the system load change was distributed to twelve thermal decomposition furnaces depending upon the respective load allowances, in Examples 1 and 2, respectively.

With respect to a thermal decomposition furnace system comprising twelve thermal decomposition furnaces in operation by using naphtha as the hydrocarbon starting material, the load allowance of each thermal decomposition furnace at a certain time was calculated by means of the above pattern (I) by using membership functions $g_1$ to $g_7$ in accordance with the method of the present invention, to obtain the results as shown in Table 1. The change in the size of olefin production obtained as a difference between the actual size of olefin production and the prelimiarily determined required size (the system load change) was distributed to the thermal decomposition furnaces depending upon the respective load allowances as calculated above. The results (the ratios of the furnace load changes i.e. ◯/Σ◯ in Table 1) are shown in FIG. 6.

The predetermined values of control factors of each thermal decomposition furnace were changed to give the required size of olefin production corresponding to the above furnace load change in accordance with the relation between the predetermined values of control factors of each thermal decomposition furnace and the size of olefin production as obtained from the operational experience in the past of this furnace system, and the operation of each thermal decomposition furnace was continued. Further, every six hours, the load allowance was calculated by means of one of patterns (I) to (IV) depending upon the relation with the above required value, and the values of control factors of each thermal decomposition furnace were controlled, and the operation was continued. This operation was repeated. As a result, the decoking periodical cycle was extended by from 15 to 20% over the conventional case where, with this furnace system, the operation of the respective thermal decomposition furnaces was continued by distributing the system load change to the thermal decomposition furnaces depending upon the experience of the operator without quantitatively calculating the load allowance of each thermal decomposition furnace.

TABLE 1

| Furnace No. | $g_1$ | $g_2$ | $g_3$ | $g_7$ | MIN ($g_4$, $g_5$, $g_6$) | Load allowance (Ⓐ) | Ⓐ/ΣⒶ |
|---|---|---|---|---|---|---|---|
| 1 | 1 | 1 | 0.6 | 1 | 0.2 | 0.12 | 0.013 |
| 2 | 1 | 0.8 | 1 | 1 | 1 | 0.8 | 0.088 |
| 3 | 1 | 1 | 1 | 1 | 0.8 | 0.8 | 0.088 |
| 4 | 1 | 1 | 0.2 | 0.95 | 1 | 0.19 | 0.021 |
| 5 | 1 | 1 | 1 | 1 | 1 | 1 | 0.11 |
| 6 | 1 | 1 | 1 | 1 | 1 | 1 | 0.11 |
| 7 | 1 | 1 | 1 | 1.05 | 1 | 1.05 | 0.115 |
| 8 | 1 | 1 | 1 | 1.05 | 1 | 1.05 | 0.115 |
| 9 | 1 | 1 | 1 | 1 | 1 | 1 | 0.11 |
| 10 | 1 | 0.7 | 0.5 | 1 | 0.3 | 0.105 | 0.011 |
| 11 | 1 | 1 | 1 | 1 | 1 | 1 | 0.11 |
| 12 | 1 | 1 | 1 | 1 | 1 | 1 | 0.11 |

EXAMPLE 2 (Grasping of the condition of each reactor by means of the load allowance function)

In the same manner as in Example 1, the load allowance of each thermal decomposition furnace at a certain time was calculated by means of the pattern (II) to obtain the results as shown in Table 2.

Figure 7:
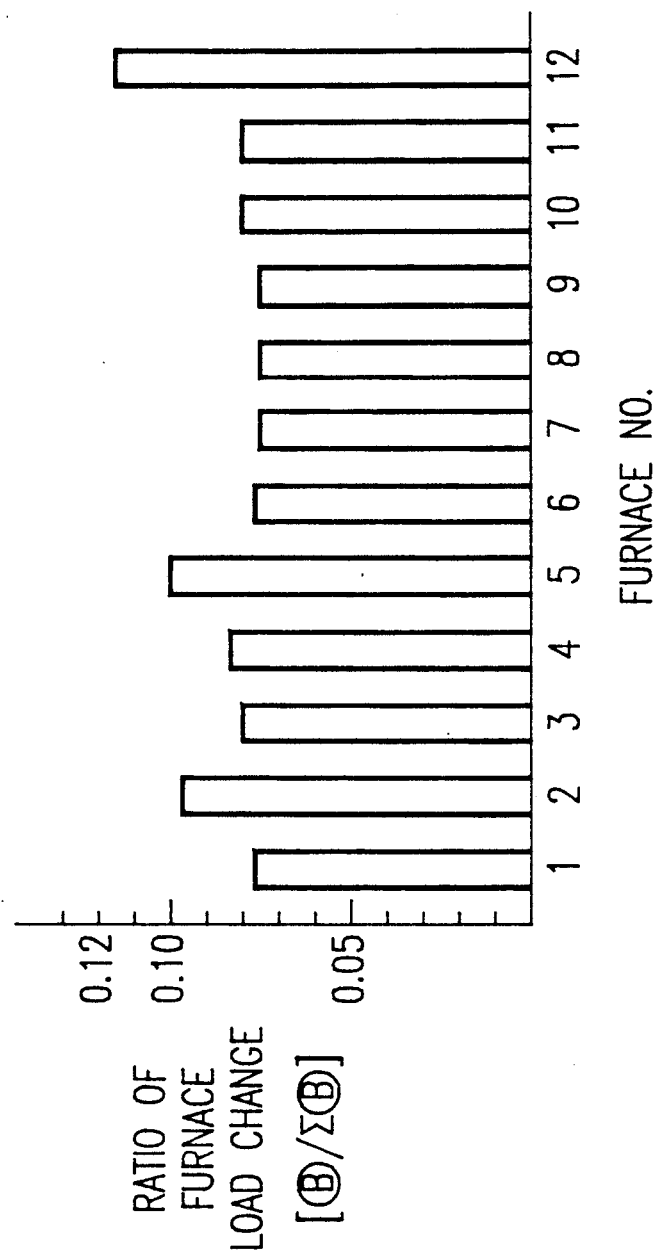

The change in the size of olefin production obtained as a difference between the actual size of olefin production and the preliminarily determined required size, was distributed as the system load change to the thermal decomposition furnaces depending upon the respective load allowances as calculated above. The results (ratios of the furnace load changes: ◯/υ◯ in Table 2) are shown in FIG. 7.

In the same manner as in Example 1, each thermal decomposition furnace wa operated depending upon this distribution, and the operation was continued, whereby the decoking periodical cycle was extended by from 15 to 20% over the conventional case.

TABLE 2

| Furnace No. | $g_1$ | $g_2$ | $g_3$ | $g_7$ | MAX ($g_4$, $g_5$, $g_6$) | Load allowance (Ⓑ) | Ⓑ/ΣⒷ |
|---|---|---|---|---|---|---|---|
| 1 | 1 | 1 | 1 | 1 | 1 | 1 | 0.077 |
| 2 | 1 | 1.2 | 1 | 1.05 | 1 | 1.26 | 0.096 |
| 3 | 1 | 1 | 1 | 1.05 | 1 | 1.05 | 0.080 |
| 4 | 1 | 1 | 1.1 | 1 | 1 | 1.1 | 0.084 |
| 5 | 1 | 1 | 1.3 | 1 | 1 | 1.3 | 0.1 |
| 6 | 1 | 1 | 1 | 1 | 1 | 1 | 0.077 |
| 7 | 1 | 1 | 1 | 0.95 | 1 | 0.95 | 0.073 |
| 8 | 1 | 1 | 1 | 0.95 | 1 | 0.95 | 0.073 |
| 9 | 1 | 1 | 1 | 0.95 | 1 | 0.95 | 0.073 |
| 10 | 1 | 1 | 1 | 1 | 1 | 1 | 0.077 |
| 11 | 1 | 1 | 1 | 1 | 1 | 1 | 0.077 |
| 12 | 1 | 1 | 1 | 1 | 1.5 | 1.5 | 0.115 |

EXAMPLE 3 (Application to the feed back control)

Figure 8:
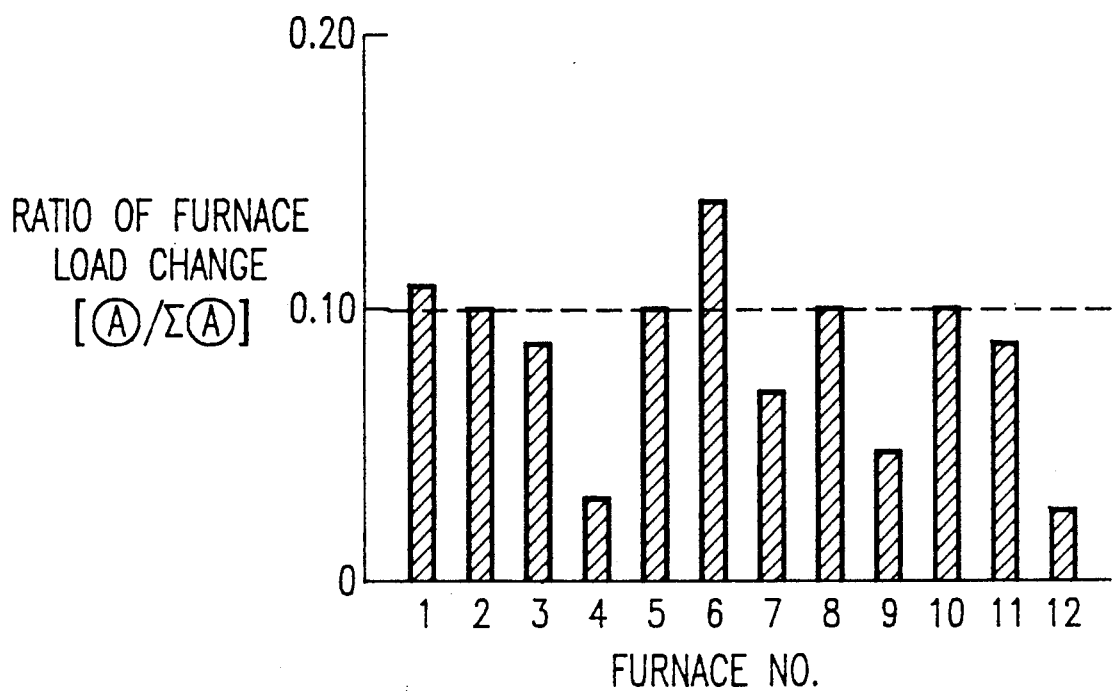
FIG. 8 is a graph showing the ratios of the furnace (i.e., reactor) load changes when the system load change was distributed to twelve thermal decomposition furnaces depending upon the respective load allowances obtained by a function of pattern (I) in Example 3.
Figure 9:
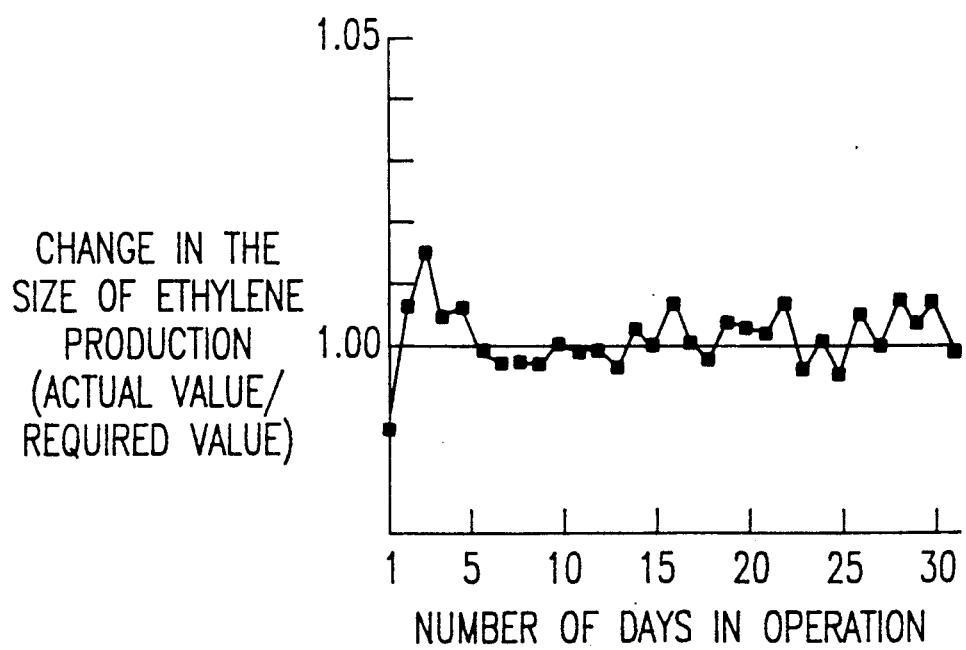
FIGS. 9 and 10 are graphs showing the changes in the sizes of production of ethylene and propylene produced by thermal decomposition furnace system when the operation of the respective thermal decomposition furnaces by the feed back control was continued in the manner of distribution of load according to the present invention as in Example 3, relative to the required values, respectively.
Figure 10:
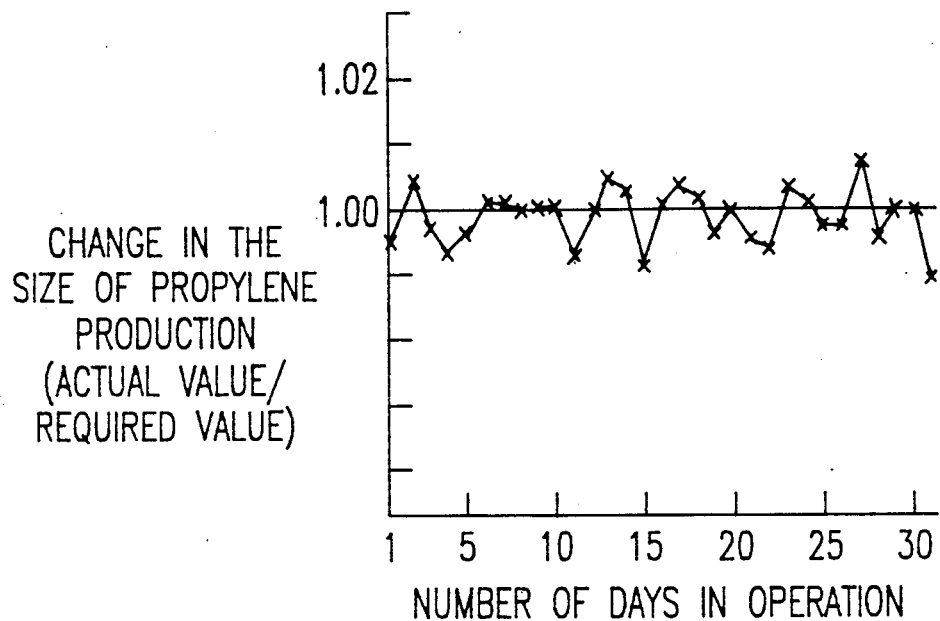

With respect to a thermal decomposition furnace system comprising twelve thermal decomposition furnaces in operation by using naphtha as the hydrocarbon starting material, the load allowance of each thermal decomposition furnace at a certain time was calculated by means of the above-mentioned pattern (I) by using membership functions $g_1$ to $g_7$ in accordance with the method of the present invention, to obtain the results as shown in Table 3. The actual size of olefin produciton was grasped from the supply rate and discharge rat of the crude olefin sent to the distillation purification system and input to a computer together with predetermined data for the required size of olefin production to obtain the system load change in accordance with the above equations (B-I) and (B-II) (where M=2), and the system load change wa distributed to the thermal decomposition furnaces depending upon the respective load allowances calculated as mentioned above. The results (the ratios of the furnace load changes: ◯/Σ◯ in Table 3) are shown in FIG. 8. From this size of distributed change, values of control factors of each thermal decomposition furnace was calculated by means of the olefin yield function, the values of the control factors were controlled, and the operation of each thermal decomposition furnace was continued. Further, every six hours, the load allowance was calculated depending upon the operational condition by means of one of patterns (I) to (IV), and the operation was continued. This computer control operation was repeated. The daily changes in the sizes of ethylene production and propylene production by the thermal decomposition furnace system (the comparison of the actual size and the required size) are shown in FIGS. 9 and 10 and in Table 4.

TABLE 3

| Furnace No. | $g_1$ | $g_2$ | $g_3$ | $g_7$ | MIN ($g_4$, $g_5$, $g_6$) | Load allowance (Ⓐ) | Ⓐ/ΣⒶ |
|---|---|---|---|---|---|---|---|
| 1 | 1 | 1 | 0.83 | 1 | 1 | 0.83 | 0.11 |
| 2 | 1 | 0.7 | 1 | 1 | 1 | 0.7 | 0.10 |
| 3 | 1 | 0.7 | 1 | 0.95 | 1 | 0.67 | 0.09 |
| 4 | 1 | 0.2 | 1 | 1.05 | 1 | 0.21 | 0.03 |
| 5 | 1 | 1 | 0.74 | 1 | 1 | 0.74 | 0.10 |
| 6 | 1 | 1 | 1 | 1 | 1 | 1 | 0.14 |
| 7 | 1 | 0.5 | 1 | 1 | 1 | 0.5 | 0.07 |
| 8 | 1 | 0.7 | 1 | 1 | 1 | 0.7 | 0.10 |
| 9 | 0.4 | 1 | 1 | 1 | 1 | 0.4 | 0.05 |
| 10 | 1 | 0.7 | 1 | 1.05 | 1 | 0.74 | 0.10 |
| 11 | 1 | 0.6 | 1 | 1.05 | 1 | 0.63 | 0.09 |

TABLE 3-continued

| Furnace No. | $g_1$ | $g_2$ | $g_3$ | $g_7$ | MIN ($g_4$, $g_5$, $g_6$) | Load allowance (Ⓐ) | Ⓐ/ΣⒶ |
| --- | --- | --- | --- | --- | --- | --- | --- |
| 12 | 1 | 1 | 0.37 | 1.05 | 0.5 | 0.19 | 0.03 |

TABLE 4

|  | Average value (x) | Standard deviation (σ) | Coefficient of variation[*1] (%) |
| --- | --- | --- | --- |
| Ethylene | 100 | 0.33 | 0.33 |
| Propylene | 100 | 0.4 | 0.40 |

[*1] Coefficient of variation (%) = (Standard deviation (σ)/Average value (x̄)) × 100

Figure 11:
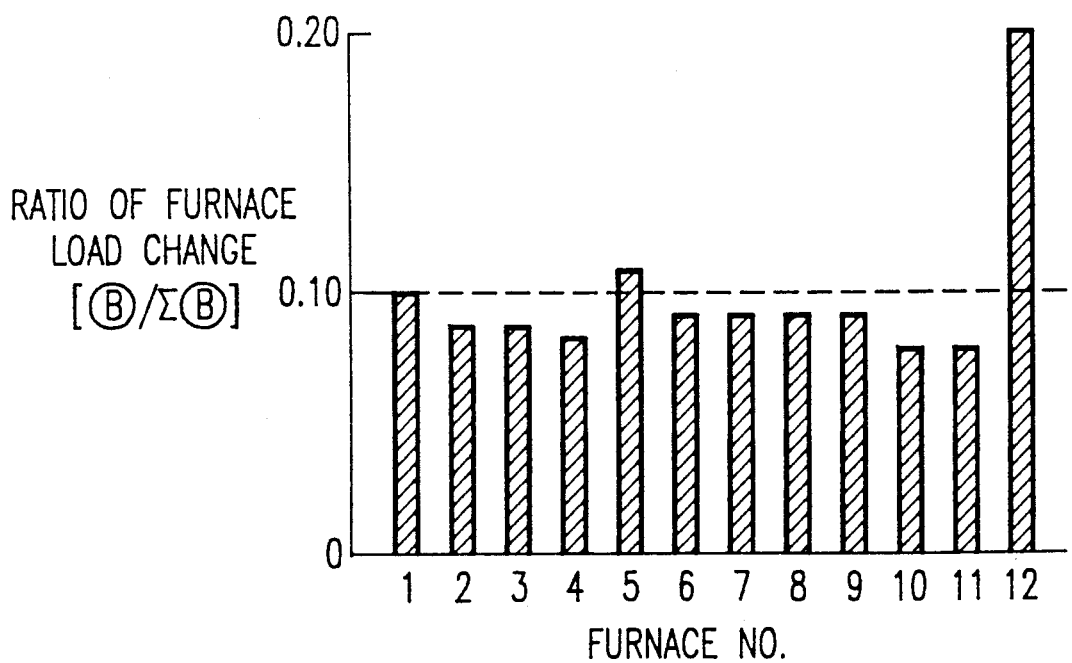
FIG. 11 is a graph showing the ratios of the furnace load changes when the system load change was distributed to twelve thermal decomposition furnaces depending upon the respective load allowances obtained by a function of pattern (II).

Further, at another time, the load allowance of each thermal decomposition furnace was calculated by means of pattern (II), and the results are shown in Table 5. The system load change was distributed to the thermal decomposition furnaces depending upon the respective load allowances, and the results (the ratios of the furnace load changes: ○/Σ○ in Table 5) are shown in FIG. 11.

TABLE 5

| Furnace No. | $g_1$ | $g_2$ | $g_3$ | $g_7$ | MAX ($g_4$, $g_5$, $g_6$) | Load allowance (Ⓑ) | Ⓑ/ΣⒷ |
| --- | --- | --- | --- | --- | --- | --- | --- |
| 1 | 1 | 1 | 1.17 | 1 | 1 | 1.17 | 0.10 |
| 2 | 1 | 1 | 1 | 1 | 1 | 1 | 0.09 |
| 3 | 1 | 1 | 1 | 1.05 | 1 | 1.05 | 0.09 |
| 4 | 1 | 1 | 1 | 0.95 | 1 | 0.95 | 0.08 |
| 5 | 1 | 1 | 1.26 | 1 | 1 | 1.26 | 0.11 |
| 6 | 1 | 1 | 1 | 1 | 1 | 1 | 0.09 |
| 7 | 1 | 1 | 1 | 1 | 1 | 1 | 0.09 |
| 8 | 1 | 1 | 1 | 1 | 1 | 1 | 0.09 |
| 9 | 1 | 1 | 1 | 1 | 1 | 1 | 0.09 |
| 10 | 1 | 1 | 1 | 0.95 | 1 | 0.95 | 0.08 |
| 11 | 1 | 1 | 1 | 0.95 | 1 | 0.95 | 0.08 |
| 12 | 1 | 1 | 1.62 | 0.95 | 1.5 | 2.31 | 0.20 |

COMPARATIVE EXAMPLE 1

Figure 12:
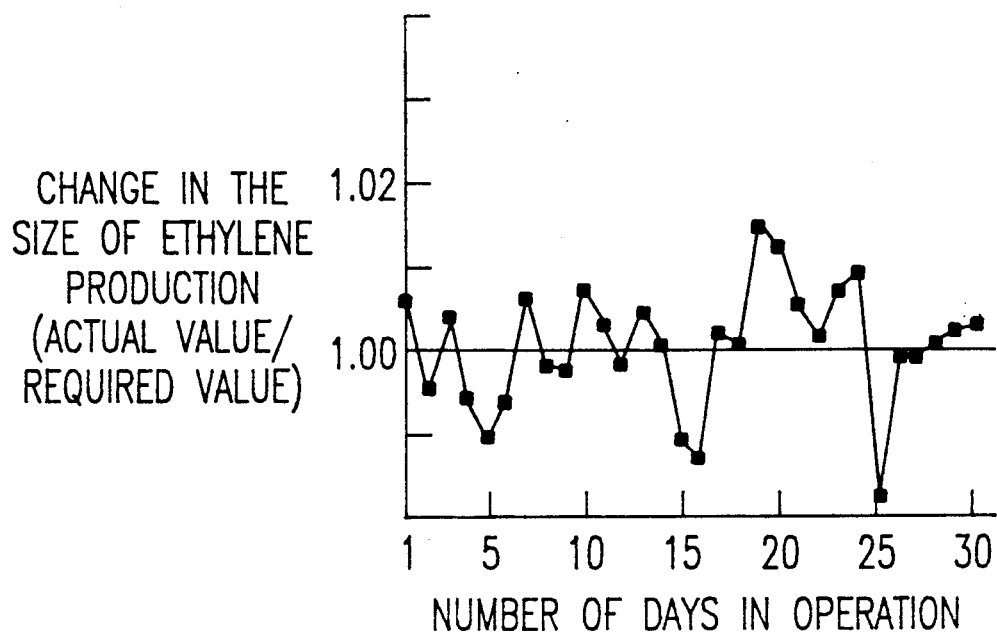
FIGS. 12 and 13 are graphs showing the sizes of production of ethylene and propylene produced by the thermal decomposition furnace systems when the operation of the respective thermal decomposition furnaces was continued in the conventional manner of distribution based on experience of an operator in Comparative Example 1, relative to the required values, respectively.
Figure 13:
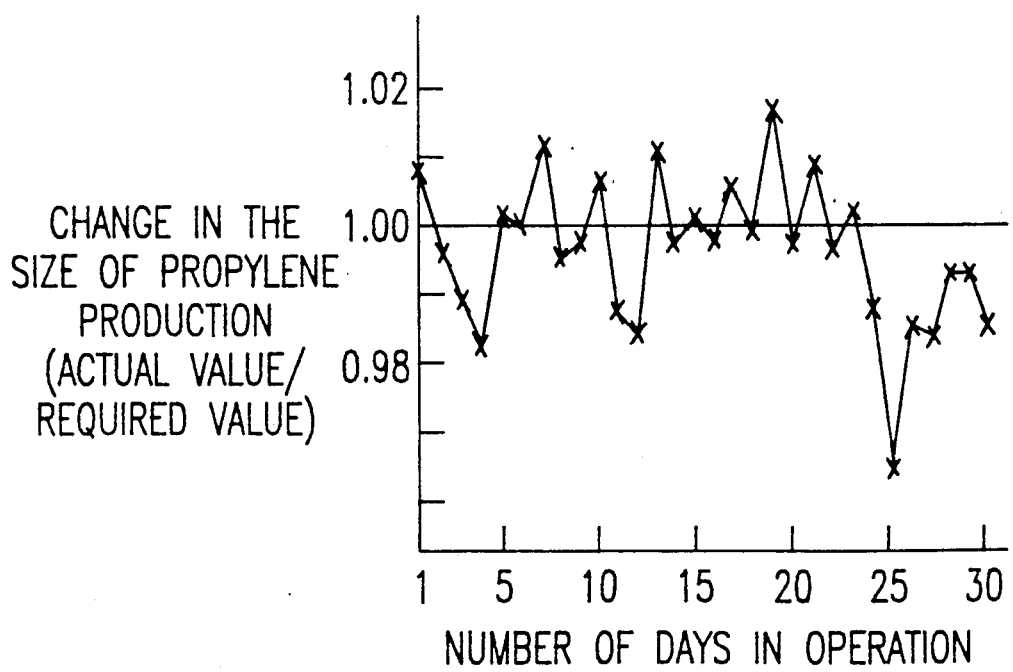

With respect to the same thermal decomposition furnace system as used in Example 3, the operation was continued by a conventional method wherein the difference between the actual size of olefin production and the required size of olefin production was distributed to the thermal decomposition furnaces depending upon the experience of the operator, whereby the daily changes in the production of ethylene and propylene produced by the thermal decomposition furnace system are shown in FIGS. 12 and 13 and in Table 6.

TABLE 6

|  | Average value (x) | Standard deviation (σ) | Coefficient of variation[*1] (%) |
| --- | --- | --- | --- |
| Ethylene | 99.65 | 0.96 | 0.96 |
| Propylene | 99.67 | 1.18 | 1.2 |

[*1] Coefficient of Variation (%) = (Standard deviation (σ)/Average value (x̄)) × 100

As is evident from the comparison between FIGS. 9 and 10 and FIGS. 12 and 13, or between Table 4 and Table 6, according to the method of the present invention, the variation of the actual size of production of ethylene or propylene from the required size of production of ethylene or propylene (the required size) is smaller as compared with the conventional method. Thus, it is evident that it is thereby possible to conduct the olefin production corresponding to the reuqired size of olefin production, and the control of the thermal decomposition furnaces for the olefin production was satisfactory.

EXAMPLE 4 (Application to the feed forward control)

With respect to a thermal decomposition furnace system comprising twelve thermal decomposition furnaces in operation by using naphtha as the hydrocarbon starting material, a suitable pattern was selected from the above-mentioned patterns (I) to (IV) depending upon the operational condition, the load allowance of each thermal decomposition furnace was calculated every one hour by means of membership functions $g_1$ to $g_7$.

On the other hand, the specific gravity was employed as the property factor of naphtha, the change of the properties of naphtha supplied was observed every one hour, and the expected changes of olefins of the system were obtained in accordance with the equations (30) and (31), whereby the starting material-based system load change was determined, and it was distributed to the thermal decomposition furnaces depending upon the respective load allowances most recently calculated as above. From the distributed size, values of control factors of each thermal decomposition furnace was calculated by means of the olefin yield function. The predetermined values of control factors were changed to the calculated values, and the operation of the respective decomposition furnaces was continued.

Figure 14:
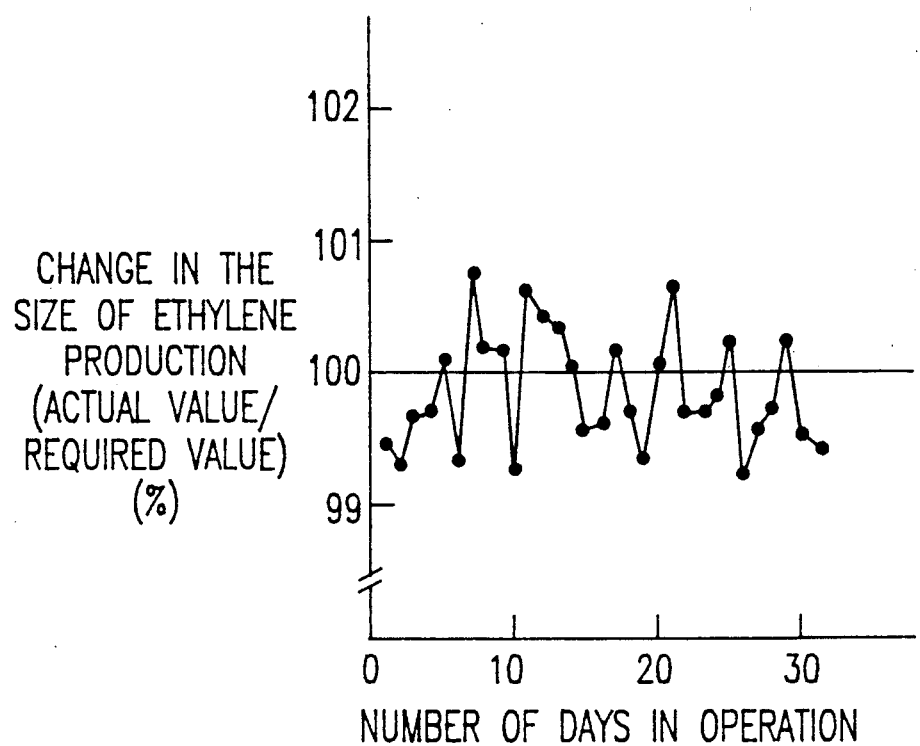
FIGS. 14 and 15 are graphs showing the changes in the sizes of production of ethylene and propylene produced by thermal decomposition furnace systems when the operation of the respective thermal decomposition furnaces by the feed forward control was continued in the manner of distribution according to the present invention as in Example 4, relative to the required values.
Figure 15:
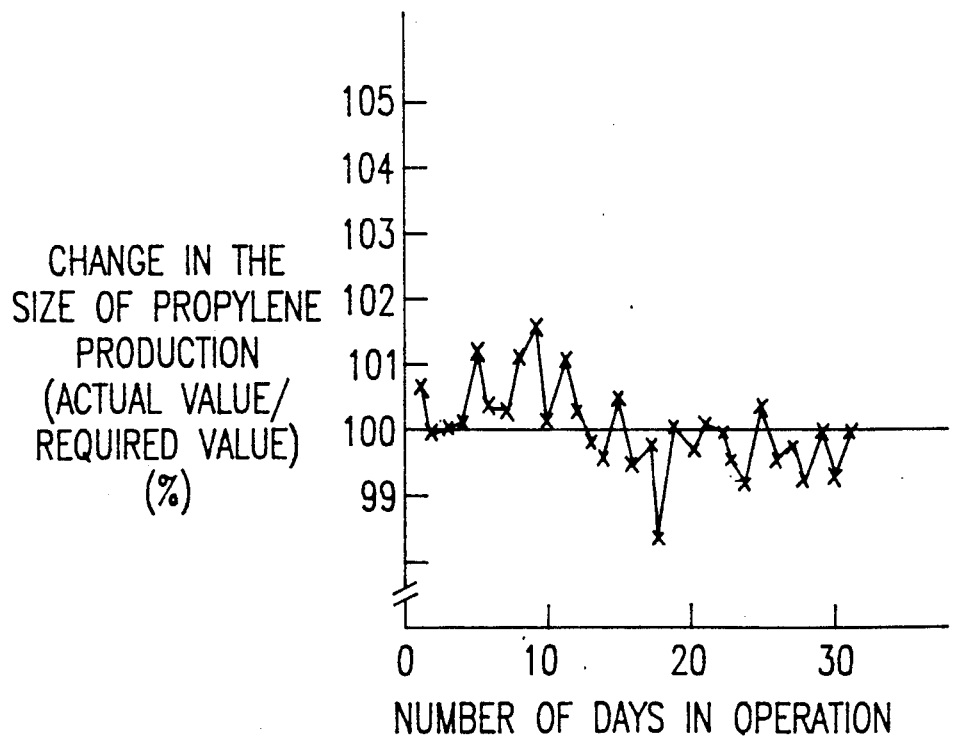

The daily changes in the sizes of production of ethylene and propylene produced by the thermal decomposition furnace system (comparison between the actual size and the required size) are shown in FIGS. 14 and 15, respectively.

COMPARATIVE EXAMPLE 2

Figure 16:
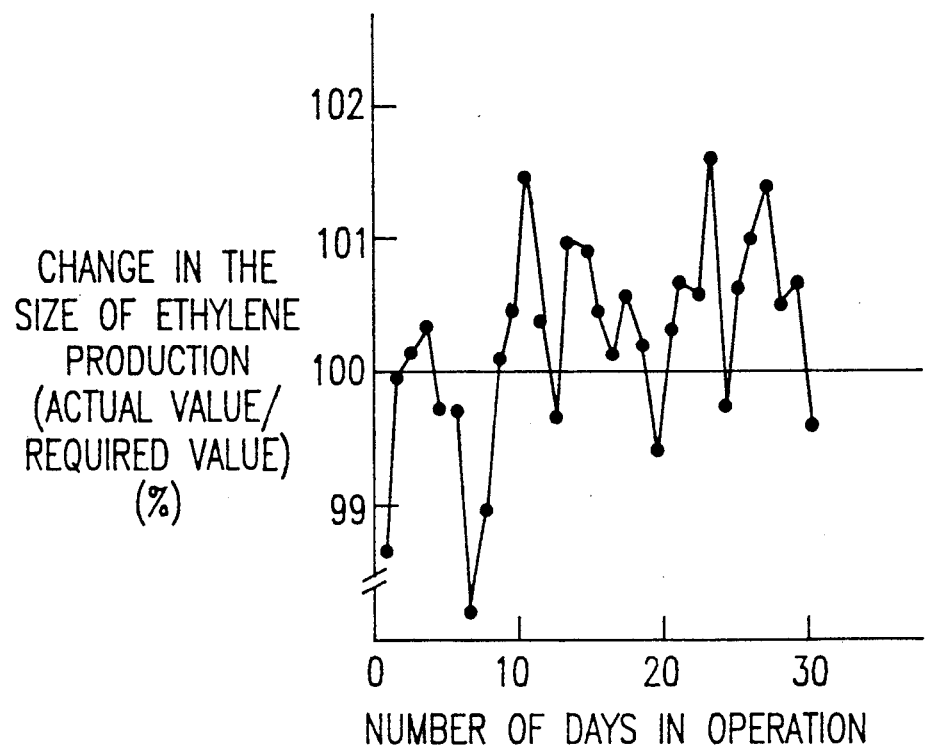
FIGS. 16 and 17 are graphs showing the sizes of production of ethylene and propylene produced by thermal decomposition furnace systems when the operation of the respective thermal decomposition furnaces was continued in the conventional manner of distribution based on experience of an operator in Comparative Example 2, relative to the required values, respectively.
Figure 17:
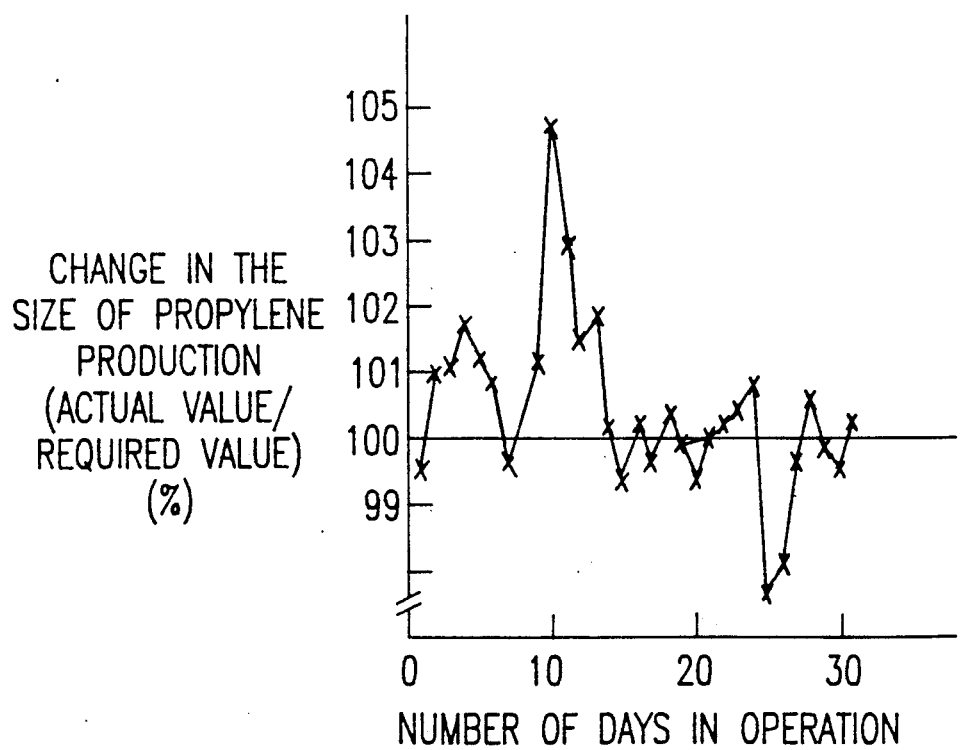

With respect to the same thermal decomposition furnace system as in Example 4, the difference between the actual size of olefin production of the previous day and the required size of olefin production, was distributed to the thermal decomposition furnaces depending upon experience of an operator without conducting the feed forward control based on the observation of the property change of the hydrocarbon starting material, and the operation was continued in such a manner that the operational condition of each thermal decomposition furnace was changed once every day. The daily changes in the sizes of production of ethylene and propylene produced by the thermal decomposition furnace system are shown in FIGS. 16 and 17.

As is evident from the comparison between FIGS. 14 and 15 and FIGS. 16 and 17, according to the method of the present invention, the variation in the actual size of production of ethylene or propylene from the required size of production of ethylene or propylene (the required size) is smaller than the conventional method. Thus, it is evident that the olefin production corresponding to the required size of olefin production can be conducted, and the control of the thermal decomposition furnaces for olefin production is good.

By grasping the condition of each reactor by means of the load allowance function according to the method of the present invention, the operation of the reactors can be adjusted more finely and more accurately depending upon the operational condition of the respective reactors, whereby the periodical cycle for tuning up, e.g. for decoking, may be prolonged. The operation which used to be conducted by an operator on the basis of his experience, can thereby systematically be carried out, whereby the personal difference in operation can be eliminated, and the operation can be simplified.

Further, the allowance for the load change of each reactor can quantitatively be evaluated, and it is possible to conduct the control of the reactors by a computer.

Furthermore, by applying the technique of grasping the condition of each reactor by means of the load allowance function according to the method of the present invention to the feed back control, the desired conversion reaction product can be produced to meet the required level of production. The deviation from the desired size of production can be minimized, and even when the desired size of production is set at a level close to the upper limit of the production capacity, good operation is ensured.

Still further, by applying the technique of grasping the condition of each reactor by means of the load allowance function according to the method of the present invention to the feed forward control, an olefin such as ethylene or propylene can be produced at a constant level even when the property of the starting material, such as the specific gravity of naphtha in the thermal decomposition reaction of naphtha, has abruptly changed.

When the technique of grasping the condition of each reactor by means of the load allowance function according to the method of the present invention is applied to a combination of the feed back control and the feed forward control, the desired thermal decomposition reaction product can be produced to meet the desired level of production irrespective of the change in the properties of the starting material, and the deviation from the desired size of production of the thermal decomposition reaction product can be minimized, whereby even if the size of production is set at a level close to the upper limit of the production capacity, good operation is ensured.

What is claimed is:

1. A method for controlling a reactor system comprising a plurality of reactors for a thermal decomposition reaction, the operation of each of said reactors being controlled under predetermined values of selected control factors, which comprises preliminarily obtaining a load allowance function representing an operational condition of each reactor in operation in terms of degree of proximity to predetermined control limits of variables representing the control factors for controlling the operation of each reactor; and during the operation of the reactor system, repeating for each reactor, inputting data of the control factors to a computer to calculate a load allowance of the load allowance function, and distributing a system load change in the size of production of the thermal decomposition reaction product of the reactor system to the reactors depending upon their respective load allowances to obtain a reactor load change of each reactor; and changing the predetermined values of control factors of each reactor to give a required size of production of the thermal decomposition reaction product corresponding to the reactor load change.

2. The method according to claim 1, wherein the thermal decomposition reaction is a thermal decomposition reaction of a hydrocarbon.

3. The method according to claim 2, wherein the hydrocarbon comprises a liquid hydrocarbon selected from the group consisting of naphtha, gas oil, kerosine, light oil and heavy oil.

4. The method according to claim 2, wherein the hydrocarbon comprises a gaseous hydrocarbon.

5. The method according to claim 1, wherein the thermal decomposition reaction is a thermal decomposition reaction of a chlorinated hydrocarbon.

6. The method according to claim 5, wherein the chlorinated hydrocarbon comprises 1,2-dichloroethane.

7. A method for controlling a reactor system comprising a plurality of reactors for a thermal decomposition reaction, the operation of each of said reactors being controlled under predetermined values of selected control factors, which comprises preliminarily obtaining a load allowance function representing an operational condition of each reactor in operation in terms of degree of proximity to predetermined control limits of variables representing the control factors for controlling the operation of each reactor, and a thermal decomposition reaction product yield function representing the yield of each thermal decomposition reaction product in terms of the control factors of each reactor and the property factors of a starting material for the thermal decomposition reaction; and during the operation of the reactor system, repeating for each reactor, inputting data of the control factors to a computer to calculate a load allowance of the load allowance function, at predetermined time intervals; at short time intervals, inputting data of an actual size of production of the thermal decomposition reaction product and data of a required size of production of the thermal decomposition reaction product, to a computer for comparison to calculate a system load change in the size of production of the thermal decomposition reaction product of the reactor system, distributing the system load change to obtain a reactor load change of each reactor, and calculating by means of the thermal decomposition reaction product yield function, values of control factors of each reactor giving a required size of production of the thermal decomposition reaction product corresponding to the reactor load change, and when the calculated values exceed the operational limits predetermined for the control factors of each reactor, adopting the operational limits as the values of control factors of each reactor, otherwise, adopting the calculated values as the values of control factors of each reactor, or calculating values of control factors of each reactor giving the size of production of the thermal decomposition reaction product closest to the required size of production of the thermal decomposition reaction product by means of the thermal decomposition reaction product yield function, subject to the operational limits of the control factors of each reactor as restrictive conditions, and adopting the calculated values as the values of control factors of each reactor; and changing the predetermined values of control factors of each reactor to the adopted values of control factors.

8. The method according to claim 7, wherein the thermal decomposition reaction is a thermal decomposition reaction of a hydrocarbon.

9. The method according to claim 8, wherein the hydrocarbon comprises a liquid hydrocarbon selected from the group consisting of the naphtha, gas oil, kerosine, light oil and heavy oil.

10. The method according to claim 8, wherein the hydrocarbon comprises a gaseous hydrocarbon.

11. The method according to claim 7, wherein the calculation of the system load change is conducted at intervals of from 3 to 10 hours.

12. A method for controlling a thermal decomposition furnace system comprising a plurality of thermal decomposition furnaces, the operation of each of said furnaces being controlled under predetermined values of selected control factors, which comprises preliminarily obtaining a load allowance function representing an operational condition of each thermal decomposition furnace in operation in terms of degree of proximity to predetermined control limits of variables representing the control factors for controlling the operation of each thermal decomposition furnace, and a thermal decomposition reaction product yield function representing the yield of each thermal decomposition reaction product in terms of the control factors of each thermal decomposition furnace and the property factors of a starting material of the thermal decomposition reaction, as variables; and during the operation of the thermal decomposition furnace system, repeating for each thermal decomposition furnace, inputting data of the control factors to a computer to calculate a load allowance of the load allowance function, at predetermined time intervals; for changing the starting material of the thermal decomposition reaction to a starting material having different properties, inputting data of the property factors of the starting material for the thermal decomposition reaction prior to the change and data of the property factors of the starting material for the thermal decomposition reaction after the change for comparison to calculate an expected change of the thermal decomposition reaction product of the system in the size of production of the thermal decomposition reaction product of the thermal decomposition furnace system by means of the thermal decomposition reaction product yield function based on the change, determining a starting material-based system load change in the size of production of the thermal decomposition reaction product of the thermal decomposition furnace system corresponding to the expected change of the thermal decomposition reaction product of the system to cancel out the change in the size of production of the thermal decomposition reaction product corresponding to the expected change of the thermal decomposition reaction product of the system, distributing the starting material-based system load change to the thermal decomposition furnaces depending upon their respective load allowances to obtain a furnace load change of each thermal decomposition furnace, and calculating by means of the thermal decomposition reaction product yield function, values of control factors of each thermal decomposition furnace giving a required size of production of the thermal decomposition reaction product corresponding to the furnace load change, and when the calculated values exceed the operational limits predetermined for the control factors of each thermal decomposition furnace, adopting the operational limits as the values for control factors of each thermal decomposition furnace, otherwise, adopting the calculated values as the values for control factors of each thermal decomposition furnace, or calculating values of control factors of each thermal decomposition furnace giving the size of production of the thermal decomposition reaction product closest to the required size of production of the thermal decomposition reaction product by means of the thermal decomposition reaction product yield function, subject to the operational limits of the control factors of each thermal decomposition furnace as restrictive conditions, and adopting the calculated values as the values for control factors of each thermal decomposition furnace; and changing the predetermined values of control factors of each thermal decomposition furnace to the adopted values of control factors.

13. The method according to claim 12, wherein the thermal decomposition reaction is a thermal decomposition reaction of a hydrocarbon.

14. The method according to claim 13, wherein the hydrocarbon comprises a liquid hydrocarbon selected from the group consiting of naphtha, gas oil, kerosine, light oil and heavy oil.

15. The method according to claim 14, wherein the hydrocarbon comprises a gaseous hydrocarbon.

16. A method for controlling a thermal decomposition furnace system comprising a plurality of thermal decomposition furnaces, the operation of each of said furnaces being controlled under predetermined values of selected control factors, which comprises preliminarily obtaining a load allowance function representing the operational condition of each thermal decomposition furnace in operation in terms of degree of proximity to predetermined control limits of variables representing the control factors for controlling the operation of each thermal decomposition furnace, and a thermal decomposition reaction product yield function representing the yield of each thermal decomposition reaction product in terms of the control factors of each thermal decomposition furnace and the property factors of a starting material of the thermal decomposition reaction, as variables; and during the operation of the thermal decomposition furnace system, repeating for each thermal decomposition furnace, inputting data of the control factors to a computer to calculate a load allowance of the load allowance function, at predetermined time intervals; and at short time intervals, inputting data of an actual size of production of the thermal decomposition reaction product and data of a required size of production of the thermal decomposition reaction product to a computer for comparison to calculate a system load change in the size of production of the thermal decomposition reaction product of the thermal decomposition furnace system, distributing the system load change to the thermal decomposition furnaces depending upon their respective load allowances to obtain a furnace load change of each thermal decomposition furnace, and calculating by means of the thermal decomposition reaction product yield function, values of the control factors of each thermal decomposition furnace giving a required size of production of the thermal decomposition reaction product corresponding to the furnace load change, and when the calculated values exceed the operational limits predetermined for the control factors of each thermal decomposition furnace, adopting the operational limits as the values of control factors for each thermal decomposition furnace, otherwise adopting the calculated values as the values of control factors of each thermal decomposition furnace, or calculating values of the control factors of each thermal decomposition furnace giving the size of production of the thermal decomposition reaction product closest to the required size of production of the thermal decomposition reaction product by means of the thermal decomposition reaction product yield function, subject to the operational limits of the control factors of each thermal decomposition furnace as restrictive conditions, and adopting the calculated values as the values for control factors of each thermal decomposition furnace; and changing the predetermined values of control factors of each thermal decomposition furnace to the adopted values of control factors; wherein for changing the starting material of the thermal decomposition reaction to a starting material having different properties, inputting data of the property factors of the starting material of the thermal decomposition reaction prior to the change and data of the property factors of the starting material for the thermal decomposition reaction after the change for comparison to calculate an expected change of the thermal decomposition reaction product of the system in the size of production of the thermal decomposition reaction product of the thermal decomposition furnace system by means of the thermal decomposition reaction product yield function based on the change, determining a starting material-based system load change in the size of production of the thermal decomposition reaction product of the thermal decomposition reaction system corresponding to the expected change of the thermal decomposition reaction product of the system to cancel out the change in the size of production of the thermal decomposition reaction product corresponding to the expected change of the thermal decomposition reaction product of the system, and replacing the system load change by the sum and the starting material-based system load change.

17. The method according to claim 16, wherein the thermal decomposition reaction is a thermal decomposition reaction of a hydrocarbon.

18. The method according to claim 17, wherein the hydrocarbon comprises a liquid hydrocarbon selected from the group consisting of naphtha, gas oil, kerosine, light oil, and heavy oil.

19. The method according to claim 17, wherein the hydrocarbon comprises a gaseous hydrocarbon.

* * * * *